(12) United States Patent
Shin et al.

(10) Patent No.: US 11,650,394 B2
(45) Date of Patent: May 16, 2023

(54) LENS DRIVING DEVICE, AND CAMERA MODULE AND OPTICAL DEVICE COMPRISING SAME

(71) Applicant: LG INNOTEK CO., LTD., Seoul (KR)

(72) Inventors: Seung Taek Shin, Seoul (KR); Jin Suk Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 156 days.

(21) Appl. No.: 17/159,604

(22) Filed: Jan. 27, 2021

(65) Prior Publication Data

US 2021/0173174 A1 Jun. 10, 2021

Related U.S. Application Data

(63) Continuation of application No. 16/081,264, filed as application No. PCT/KR2017/002492 on Mar. 8, 2017, now Pat. No. 10,935,751.

(30) Foreign Application Priority Data

Mar. 8, 2016 (KR) .................. 10-2016-0027591
Apr. 21, 2016 (KR) .................. 10-2016-0048828

(51) Int. Cl.
*G02B 7/09* (2021.01)
*H04N 23/60* (2023.01)
(Continued)

(52) U.S. Cl.
CPC ............... *G02B 7/09* (2013.01); *G03B 3/10* (2013.01); *G03B 3/12* (2013.01); *H04N 23/60* (2023.01); *H02K 41/0354* (2013.01)

(58) Field of Classification Search
CPC ... G02B 7/09; G02B 5/28; G02B 7/02; H02K 11/20; H02K 11/00; H02K 33/16; G01J 3/28; G03B 3/10; G03B 13/36
(Continued)

(56) References Cited

U.S. PATENT DOCUMENTS 5,682,097 A 10/1997 Bryant et al.
2010/0328791 A1* 12/2010 Jung .................. G03B 17/02
359/823
2015/0177479 A1* 6/2015 Lee .................. G03B 3/10
359/824

FOREIGN PATENT DOCUMENTS

CN 204515213 U 7/2015
CN 105022203 A 11/2015
(Continued)

OTHER PUBLICATIONS

International Search Report in International Application No. PCT/KR2017/002492, filed Mar. 8, 2017.
(Continued)

*Primary Examiner* — James R Greece
(74) *Attorney, Agent, or Firm* — Saliwanchik, Lloyd & Eisenschenk

(57) ABSTRACT

An embodiment comprises: a housing comprising a plurality of protrusions arranged on the upper surface thereof; a magnet arranged on a side portion of the housing; a bobbin having a first coil arranged on the outer peripheral surface thereof, the bobbin being configured to move by means of an interaction between the magnet and the first coil; an upper elastic member coupled to the bobbin and to the housing; and a sensing coil arranged on the side portion of the housing between the protrusions and the magnet, the sensing coil being configured to generate an induction voltage by means of an interaction with the first coil, wherein at least a part of the upper elastic member is arranged on the upper surface of the housing between the protrusions.

20 Claims, 19 Drawing Sheets

(51) Int. Cl.
*G03B 3/10* (2021.01)
*G03B 3/12* (2021.01)
*H02K 41/035* (2006.01)

(58) Field of Classification Search
USPC .................................................. 359/811, 823
See application file for complete search history.

(56) References Cited

FOREIGN PATENT DOCUMENTS

| CN | 105093475 A | 11/2015 |
| CN | 106067939 A | 11/2016 |
| CN | 108781033 A | 11/2018 |
| EP | 2 937 726 A1 | 10/2015 |
| EP | 3 086 154 A1 | 10/2016 |
| JP | 03168935 A1 * | 7/1991 |
| JP | H0-3168935 A | 7/1991 |
| JP | 2014-126668 A | 7/2014 |
| JP | 2015-191213 A | 11/2015 |
| KR | 10-2013-0055288 A | 5/2013 |
| KR | 10-1257676 B1 | 5/2013 |
| KR | 10-2015-0089648 A | 8/2015 |
| KR | 10-2015-0090663 A | 8/2015 |
| KR | 10-2015-0104388 A | 9/2015 |
| KR | 10-2015-0128262 A | 11/2015 |
| KR | 10-2016-0001576 A | 1/2016 |
| KR | 10-2016-0017448 A | 2/2016 |

OTHER PUBLICATIONS

Supplementary European Search Report dated Feb. 19, 2019 in European Application No. 17763557.0.
Office Action dated Sep. 24, 2020 in Chinese Application No. 201780027030.3.
Office Action dated Jun. 8, 2020 in U.S. Appl. No. 16/081,264.
Notice of Allowance dated Oct. 27, 2020 in U.S. Appl. No. 16/081,264.
Office Action dated Jun. 22, 2022 in Chinese Application No. 201780027030.3.
Office Action dated May 27, 2022 in Korean Application No. 10-2016-0027591.

* cited by examiner

LENS DRIVING DEVICE, AND CAMERA MODULE AND OPTICAL DEVICE COMPRISING SAME

CROSS-REFERENCE TO RELATED APPLICATIONS

This application is a continuation of U.S. application Ser. No. 16/081,264, filed Aug. 30, 2018; which is the U.S. national stage application of International Patent Application No. PCT/KR2017/002492, filed Mar. 8, 2017, which claims the benefit under 35 U.S.C. § 119 of Korean Application Nos. 10-2016-0027591, filed Mar. 8, 2016, and 10-2016-0048828, filed Apr. 21, 2016, the disclosures of each of which are incorporated herein by reference in their entirety.

TECHNICAL FIELD

Embodiments relate to a lens driving device and to a camera module and an optical apparatus including the same.

BACKGROUND ART

It is difficult to apply the technology of a voice coil motor (VCM) used in a conventional camera module to an ultra-small camera module while still realizing low power consumption thereof, and thus research has been actively conducted in relation thereto.

There is increasing demand for, and production of, electronic products such as smart phones and cellular phones equipped with cameras. Cameras for cellular phones have been increasing in resolution and miniaturization, and accordingly, an actuator is also becoming smaller, larger in diameter, and more multi-functional. In order to realize a high-resolution cellular phone camera, additional functions, such as improvement in the performance of the cellular phone camera, autofocusing, shutter shaking prevention, and zooming in and out, are required.

DISCLOSURE

Technical Problem

Embodiments provide a lens driving device, which is capable of securing a sufficient distance between a sensing coil and a first coil and overcoming a spatial limitation pertaining to installation of an upper elastic member in a housing, and a camera module and an optical apparatus including the same.

Technical Solution

In one embodiment, a lens driving device includes: a housing including a plurality of protruding portions provided on an upper surface thereof; a magnet disposed on a side portion of the housing; a bobbin including a first coil disposed on an outer circumferential surface thereof and configured to be moved by interaction between the magnet and the first coil; an upper elastic member coupled to the bobbin and the housing; and a sensing coil disposed on the side portion of the housing between the protruding portions and the magnet and configured to generate an inductive voltage by interaction with the first coil, wherein at least a portion of the upper elastic member is disposed on the upper surface of the housing between the protruding portions.

The side portion of the housing may include: first side portions on which the magnet is disposed; and second side portions, each interconnecting two adjacent first side portions among the first side portions, and the sensing coil may be disposed on an outer surface of the first and second side portions so as to be wound in a clockwise or counterclockwise direction about an optical axis.

The plurality of protruding portions may include a first protruding portion provided on an upper surface of at least one of the first side portions; and a second protruding portion provided on an upper surface of at least one of the second side portions, and at least a portion of the upper elastic member may be disposed on the upper surface of the housing between the first protruding portion and the second protruding portion.

The upper elastic member may include: an inner frame coupled to the bobbin; an outer frame coupled to the upper surface of the housing; and a frame connection portion interconnecting the inner frame and the outer frame, and a portion of the outer frame may be disposed on the upper surface of the housing between the first protruding portion and the second protruding portion.

A connection portion of the outer frame and the frame connection portion may be disposed on the upper surface of the housing between the first protruding portion and the second protruding portion.

The outer surface of the first and second side portions of the housing may be formed with a seating groove, and the sensing coil may be disposed in the seating groove.

The sensing coil may be disposed on an upper end of an outer surface of the side portion of the housing so as to be spaced apart from the upper elastic member disposed on the upper surface of the housing.

The plurality of protruding portions may be disposed in a first area of the upper surface of the housing, at least a portion of the upper elastic member may be disposed in a second area of the upper surface of the housing that is located between the plurality of protruding portions, and the second area of the upper surface of the housing may be open to the outer surface of the side portion of the housing.

The sensing coil disposed on the housing may overlap the plurality of protruding portions in the optical-axis direction.

The first protruding portion may be disposed so as to be aligned with the center of the upper surface of at least one of the first side portions, and the second protruding portion may be disposed so as to be aligned with the center of the upper surface of at least one of the second side portions.

The first protruding portion may have a linear shape, and the second protruding portion may have a bent shape.

The lens driving device may further include a support member connected to the outer frame of the upper elastic member, and the support member may be located inside the sensing coil.

In another embodiment, a lens driving device includes: a housing; a magnet disposed on the housing; a bobbin including a first coil disposed on an outer circumferential surface thereof; an upper elastic member coupled to the bobbin and the housing; and a sensing coil disposed on a side portion of the housing and configured to generate an inductive voltage by interaction with the first coil, wherein the housing includes at least one recess provided in an upper surface thereof, at least a portion of the upper elastic member is disposed in the at least one recess in the housing, and at least a portion of the upper elastic member disposed in the at least one recess is open from the upper surface of the housing.

The at least one recess may be open to an outer surface of the side portion of the housing, and the at least a portion of the upper elastic member disposed in the at least one recess may be exposed from the outer surface of the side portion of the housing.

The upper elastic member may include: an inner frame coupled to the bobbin; an outer frame coupled to the upper surface of the housing; and a frame connection portion interconnecting the inner frame and the outer frame, and at least a portion of the outer frame may be disposed in the at least one recess.

The sensing coil may be disposed so as to be spaced apart from the upper elastic member that is disposed in the recess.

The at least one recess may be provided in the side portion of the housing on which the magnet is disposed.

The at least one recess may be disposed adjacent to at least one side of the upper surface of the housing.

The at least one recess may include a bottom and a side surface, the sensing coil may be disposed under the bottom of the at least one recess, and at least a portion of the upper elastic member may be disposed in contact with the bottom of the at least one recess.

At least a portion of the outer frame disposed in the at least one recess may overlap the sensing coil in the optical-axis direction.

The depth of the bottom of the at least one recess may be equal to or greater than the height of at least a portion of the upper elastic member disposed on the bottom of the recess.

An upper support protrusion coupled to at least a portion of the upper elastic member may be provided on the bottom of the at least one recess.

In another embodiment, a lens driving device includes a housing including a plurality of side portions; a magnet disposed on the plurality of side portions of the housing; a bobbin including a first coil disposed on an outer circumferential surface thereof and configured to be moved via interaction between the magnet and the first coil; an upper elastic member coupled to the bobbin and the housing; a sensing coil disposed on the side portions of the housing and configured to generate an inductive voltage via interaction with the first coil; and a second coil disposed so as to face the magnet and configured to move the housing via interaction with the magnet, wherein an upper surface of the plurality of side portions of the housing includes a first area and a second area, at least a portion of the upper elastic member is disposed on the second area, the first area is configured to protrude from the second area, and the second area is recessed from the first area.

The second area may be open to each of an outer surface and an inner surface of the side portions of the housing.

In another embodiment, a lens driving device includes a housing; a bobbin located inside the housing; a first drive unit located in the bobbin; a second drive unit located in the housing so as to face the first drive unit; and a first support member coupled to the housing and the bobbin, wherein the first support member includes an outer frame coupled to the housing; an inner frame coupled to the bobbin; and a frame connection portion interconnecting the outer frame and the inner frame, wherein the outer frame includes a first outer portion and a second outer portion spaced apart from each other, wherein the first outer portion is connected to the inner frame via the frame connection portion, and wherein the second outer portion is spaced apart from the inner frame and the frame connection portion.

The outer frame may further include: a third outer portion spaced apart from the first outer portion and the second outer portion; and a fourth outer portion spaced apart from the first outer portion, the second outer portion, and the third outer portion, the frame connection portion may include first to fourth connection portions that are spaced apart from each other, the inner frame may include a first inner portion and a second inner portion that are spaced apart from each other, the first outer portion may be connected to the first inner portion through the first connection portion and the second connection portion, the third outer portion may be connected to the second inner portion through the third connection portion and the fourth connection portion, and the fourth outer portion may be spaced apart from the frame connection portion and the inner frame.

The first drive unit may include a first coil unit, the lens driving device may further include a second coil unit located on the housing, two outer portions among the first to fourth outer portions may be electrically connected to the second coil unit, and the other two outer portions may be electrically connected to the first coil unit.

The lens driving device may further include a current applying unit configured to apply current to the first coil unit; and a sensing unit configured to sense at least one of a voltage or current induced in the second coil unit.

The first support member may be coupled to an upper portion of the housing and an upper portion of the bobbin, the lens driving device may further include a second support member coupled to a lower portion of the housing and a lower portion of the bobbin, and the second support member may be integrally formed.

The lens driving device may further include: a third drive unit facing the second drive unit; a substrate located under the housing, the third drive unit being located on the substrate; and a third support member coupled to the first support member and the substrate.

The lens driving device may include a first support portion coupled to the first outer portion, a second support portion coupled to the second outer portion, a third support portion coupled to the third outer portion, and a fourth support portion coupled to the fourth outer portion, and the first to fourth support portions may be spaced apart from each other.

The housing may include a first side surface portion and a second side surface portion adjacent to the first side surface portion, the bobbin may include a first side portion facing the first side surface portion and a second side portion facing the second side surface portion, the first outer portion may include a first outer coupling portion coupled to the first side surface portion and a second outer coupling portion coupled to the second side surface portion, the inner frame may include a first inner coupling portion coupled to the first side portion and a second inner coupling portion coupled to the second side portion, and the frame connection portion may include a first connection portion directly interconnecting the first outer coupling portion and the second inner coupling portion.

The housing may further include a third side surface portion adjacent to the second side surface portion, the bobbin may further include a third side portion facing the third side surface portion, the first outer portion may further include a third outer coupling portion coupled to the third side surface portion, the inner frame may further include a third inner coupling portion coupled to the third side portion, and the frame connection portion may further include a second connection portion directly interconnecting the second outer coupling portion and the third inner coupling portion.

The inner frame may further include a dummy portion interconnecting the first inner coupling portion and the second inner coupling portion.

The second outer portion and the fourth outer portion may not be coupled to the bobbin, but may be coupled only to the housing.

The second coil unit may be located between the housing and the first support member.

In another embodiment, a lens driving device includes: a housing; a bobbin located inside the housing; a first drive unit located in the bobbin; a second drive unit located in the housing so as to face the first drive unit; and a support member coupled to the housing and the bobbin, wherein the support member includes a first support unit and a second support unit spaced apart from the first support unit, the first support unit is coupled to the housing and the bobbin, and the second support unit is spaced apart from the bobbin and is coupled only to the housing.

In another embodiment, a camera module includes: a lens barrel; the lens driving device according to the embodiment configured to move the lens barrel; and an image sensor configured to convert an image introduced through the lens driving device into an electric signal.

In a further embodiment, an optical apparatus includes: a display module including a plurality of pixels, a color of which changes by an electric signal; the camera module according to the embodiment configured to convert an image introduced through a lens into an electric signal; and a controller configured to control the operation of the display module and the camera module.

Advantageous Effects

Embodiments may secure a sufficient distance between a sensing coil and a first coil and may overcome a spatial limitation pertaining to installation of an upper elastic member in a housing.

MODE FOR INVENTION

Figure 1:
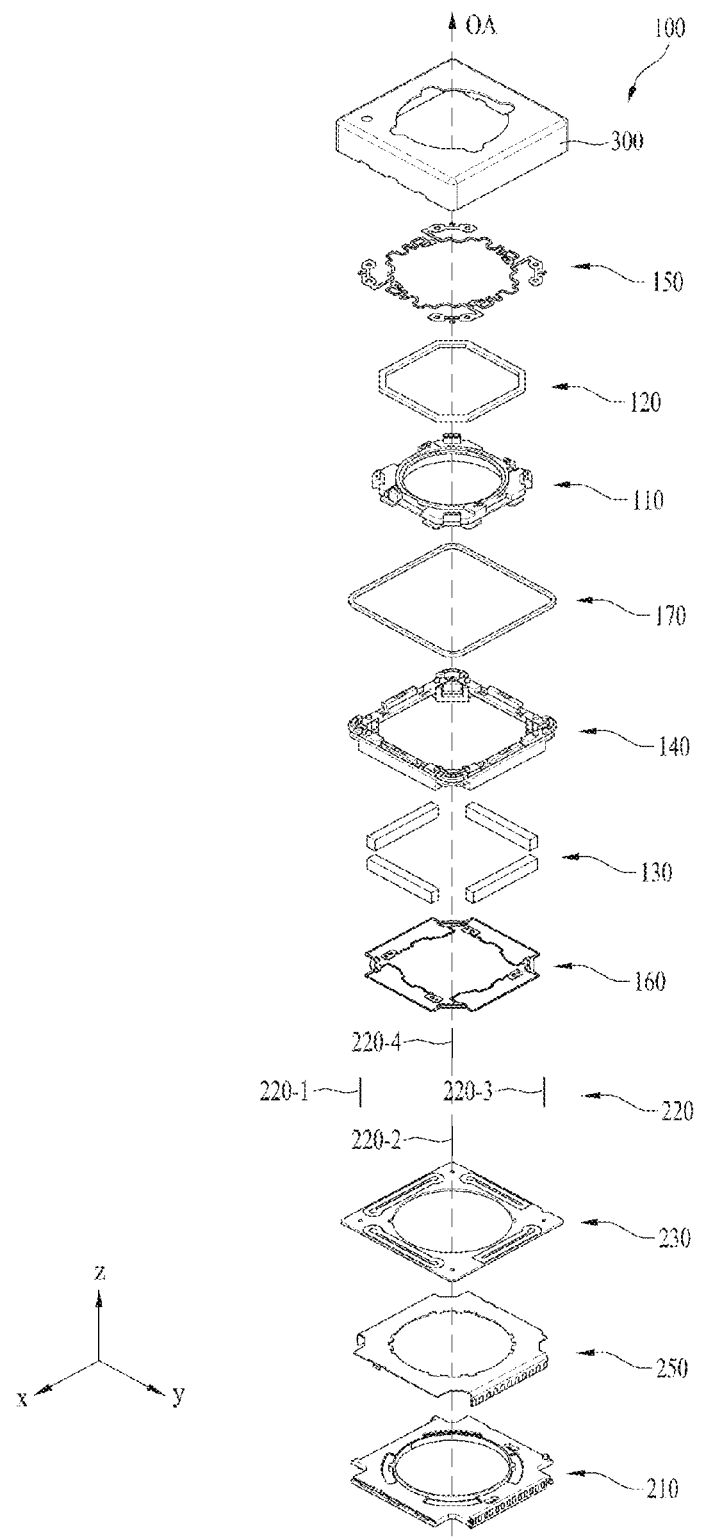
FIG. 1 illustrates an exploded perspective view of a lens driving device according to an embodiment.

Hereinafter, embodiments will become apparent with reference to the attached drawings and a description related thereto. In the description of the embodiments, it will be understood that when an element, such as a layer (film), a region, a pattern or a structure, is referred to as being "on" or "under" another element, such as a substrate, a layer (film), a region, a pad or a pattern, the term "on" or "under" means that the element is "directly" on or under another element or is "indirectly" formed such that an intervening element may also be present. In addition, it will also be understood that the criteria of "on" or "under" is on the basis of the drawings. In addition, the same reference numerals will denote the same elements via the description of the drawings.

Hereinafter, a lens driving device according to the embodiments will be described with reference to the accompanying drawings. For convenience of description, the lens driving device according to the embodiments will be described using a Cartesian coordinate system (x, y, z), but may be described using any other coordinate system, and the embodiments are not limited as to the coordinate system. In the drawings, an x axis and a y axis are directions orthogonal to a z axis, which is an optical-axis direction. The z-axis direction, which is the optical-axis direction, may be referred to as a "first direction", the x-axis direction may be referred to as a "second direction", and the y-axis direction may be referred to as a "third direction".

A "hand-tremor compensation device" used in a small-sized camera module mounted in a mobile device, such as a smartphone or a tablet PC, is a device configured to inhibit the outline of a captured image from being blurred due to vibration caused by the shaking of a user's hand when the image is captured.

In addition, an "auto-focusing device" is a device for automatically focusing an image of a subject on the surface of an image sensor.

An "autofocus function" is defined as a function of focusing a subject on the image sensor by moving a lens module in the optical-axis direction according to the distance to the subject so as to adjust the distance to the image sensor in order to enable acquisition of a clear image of the subject. The term "autofocus" may be mixed with "AF(Auto Focus)".

A "hand-tremor compensation function" mentioned below is defined as a function of moving or tilting the lens module in a direction orthogonal to the optical-axis direction so as to cancel shaking (movement) generated in the image sensor by external force. The term "hand-tremor compensation" may be interchanged with "optical image stabilization (OIS)".

The hand-tremor compensation device and the auto-focusing device may be configured in various manners. A lens driving device according to the embodiments may perform a hand-tremor compensation operation and/or an auto-focusing operation by moving an optical module constituted by at least one lens in the first direction or moving the optical module relative to a plane defined by the second and third directions, which are orthogonal to the first direction.

Figure 2:
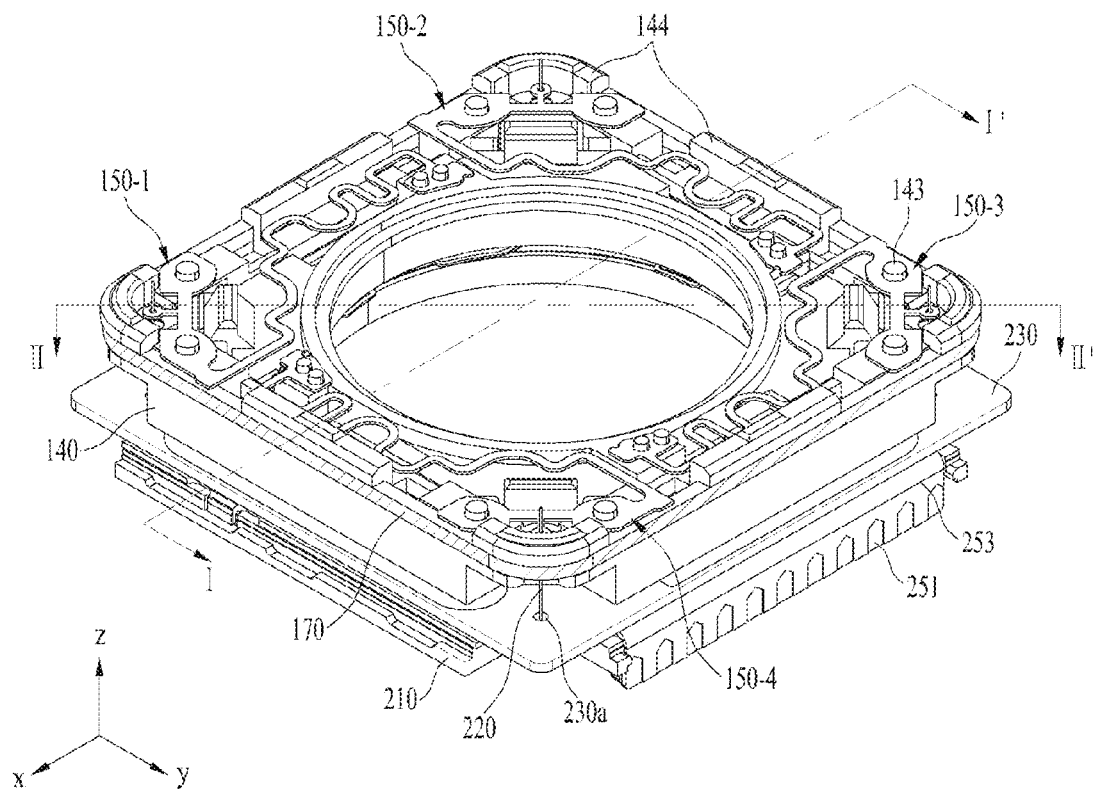
FIG. 2 illustrates an assembled perspective view illustrating the lens driving device excluding a cover member of FIG. 1.

FIG. 1 is an exploded perspective view of the lens driving device 100 illustrated in FIG. 1, and FIG. 2 is an assembled perspective view of the lens driving device excluding a cover member 300 of FIG. 1.

Referring to FIGS. 1 and 2, the lens driving device 100 includes a bobbin 110, a first coil 120, a magnet 130, a housing 140, an upper elastic member 150, a lower elastic member 160, and a sensing coil 170.

In addition, the lens driving device 100 may further include a support member 220, a second coil 230, an optical image stabilization (OIS) position sensor 240, and a circuit board 250.

In addition, the lens driving device 100 may further include a base 210 and the cover member 300.

First, the cover member 300 will be described.

The cover member 300 accommodates the bobbin 110, the first coil 120, the magnet 130, the housing 140, the upper elastic member 150, the lower elastic member 160, the sensing coil 170, the support member 220, the second coil 230, the OIS position sensor 240, and the circuit board 250 in an accommodating space defined between the cover member and the base 210.

The cover member 300 may take the form of a box having an open bottom and an upper end portion and sidewalls, and the bottom of the cover member 300 may be coupled to the top of the base 210. The upper end portion of the cover member 300 may have a polygonal shape, for example, a rectangular shape, an octagonal shape, or the like.

The cover member 300 may have a hollow region formed in the upper end portion thereof to expose a lens (not illustrated) coupled to the bobbin 110 to external light. In addition, the hollow region in the cover member 300 may be additionally provided with a window formed of a light-transmitting material in order to inhibit foreign substances, such as dust or moisture, from entering the inside of a camera module.

The cover member 300 may be formed of a nonmagnetic material such as SUS in order to inhibit the cover member from adhering to the magnet 130, but may be formed of a magnetic material to serve as a yoke.

Next, the bobbin 110 will be described.

Figure 3:
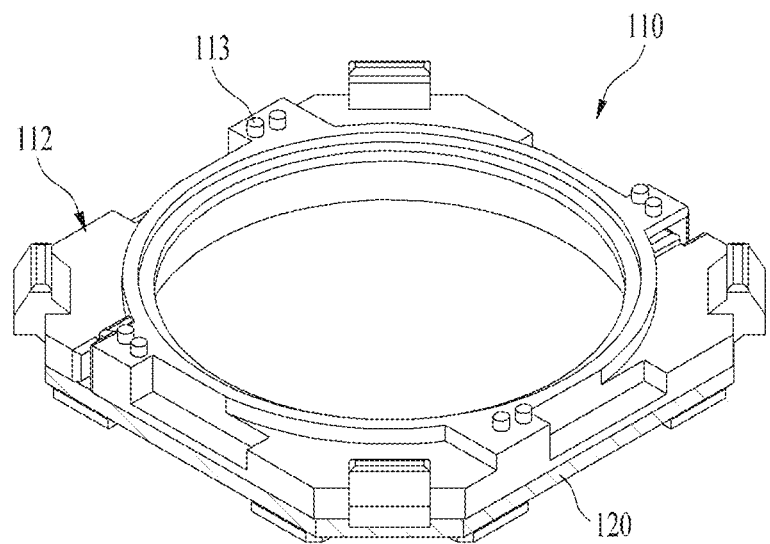
FIG. 3 illustrates a perspective view of a bobbin illustrated in FIG. 1.

FIG. 3 illustrates a perspective view of the bobbin 110 illustrated in FIG. 1

Referring to FIG. 3, the bobbin 110 is located inside the housing 140 and is movable in the first direction via electromagnetic interaction between the coil 120 and the magnet 130.

The bobbin 110 may include a lens barrel (not illustrated) in which at least one lens is provided, although not illustrated, and the lens barrel may be coupled inside the bobbin 110 in any of various manners.

The bobbin 110 may have a hollow region for mounting the lens or the lens barrel. The hollow region of the bobbin 110 may have the same shape as the lens or lens barrel to be mounted therein, and may have, for example, a circular shape, an elliptical shape, or a polygonal shape, without limitation thereto.

The bobbin 110 may include at least one upper support protrusion 113, which is disposed on the upper surface and is coupled to and fixed to an inner frame 151 of the upper elastic member 150, and at least one lower support protrusion (not illustrated), which is disposed on the lower surface and is coupled to and fixed to an inner frame 161 of the lower elastic member 160.

The bobbin 110 may have an upper avoidance groove 112 formed in a region of the upper surface thereof corresponding to or aligned with a frame connection portion 153 of the upper elastic member 150. In addition, the bobbin 110 may have a lower avoidance groove (not illustrated) formed in a region of the lower surface thereof corresponding to or aligned with a connection portion 163 of the lower elastic member 160. In another embodiment, the connection portion of the upper elastic member and the bobbin are designed not to interfere with each other, in which case the upper avoidance groove and/or the lower avoidance groove of the bobbin may not be provided.

The bobbin 110 may have at least one groove (not illustrated) formed in the outer circumferential surface thereof, in which the first coil 120 is disposed. The first coil 120 may be placed or seated in the groove. Alternatively, the first coil 120 may be directly wound in the groove so as to rotate in a clockwise or counterclockwise direction about the optical axis OA. The shape and number of grooves may correspond to the shape and number of coils disposed on the outer circumferential surface of the bobbin 110. In another embodiment, the bobbin 110 may not have a coil seating groove, and the first coil 120 may be directly wound around the outer circumferential surface of the bobbin 110, or may be wound and fixed.

Next, the first coil 120 will be described.

The first coil 120 may be a driving coil disposed on the outer circumferential surface of the bobbin 110 to electromagnetically interact with the magnet 130 disposed on the housing 140. A driving signal (e.g., driving current) may be applied to the first coil 120 in order to generate an electromagnetic force due to the interaction between the first coil 120 and the magnet 130.

According to Fleming's left-hand rule, an autofocus (AF) movable unit may be moved in the first direction by the electromagnetic force due to the interaction between the first coil 120 and the magnet 130. The movement of the AF movable unit in the first direction may be controlled by controlling the driving signal applied to the first coil 120 so as to adjust the intensity and/or the direction of the electromagnetic force. Thereby, an auto-focusing function may be performed.

The AF movable unit may include the bobbin 110 elastically supported by the upper and lower elastic members 150 and 160 and constituent elements mounted in the bobbin 110 so as to be moved together with the bobbin 110. For example, the AF movable unit may include the bobbin 110, the first coil 120, and the lens (not illustrated) mounted in the bobbin 110.

The first coil 120 may be wound around the outer circumferential surface of the bobbin 110 so as to rotate in a clockwise or counterclockwise direction about the optical axis OA. In another embodiment, the first coil 120 may be implemented in the form of a coil ring that is wound in a clockwise or counterclockwise direction about an axis orthogonal to the optical axis OA, and the number of coil rings may be the same as the number of magnets 130, without limitation thereto.

The first coil 120 may be electrically connected to at least one of the upper elastic member 150 or the lower elastic member 160 in order to receive the driving signal.

Next, the housing 140 will be described.

The housing 140 may support the magnet 130 and the sensing coil 170, and may accommodate the bobbin 110 therein so as to allow the bobbin 110 to be moved in the first direction by the electromagnetic force due to the interaction between the first coil 120 and the magnet 130.

Figure 4:
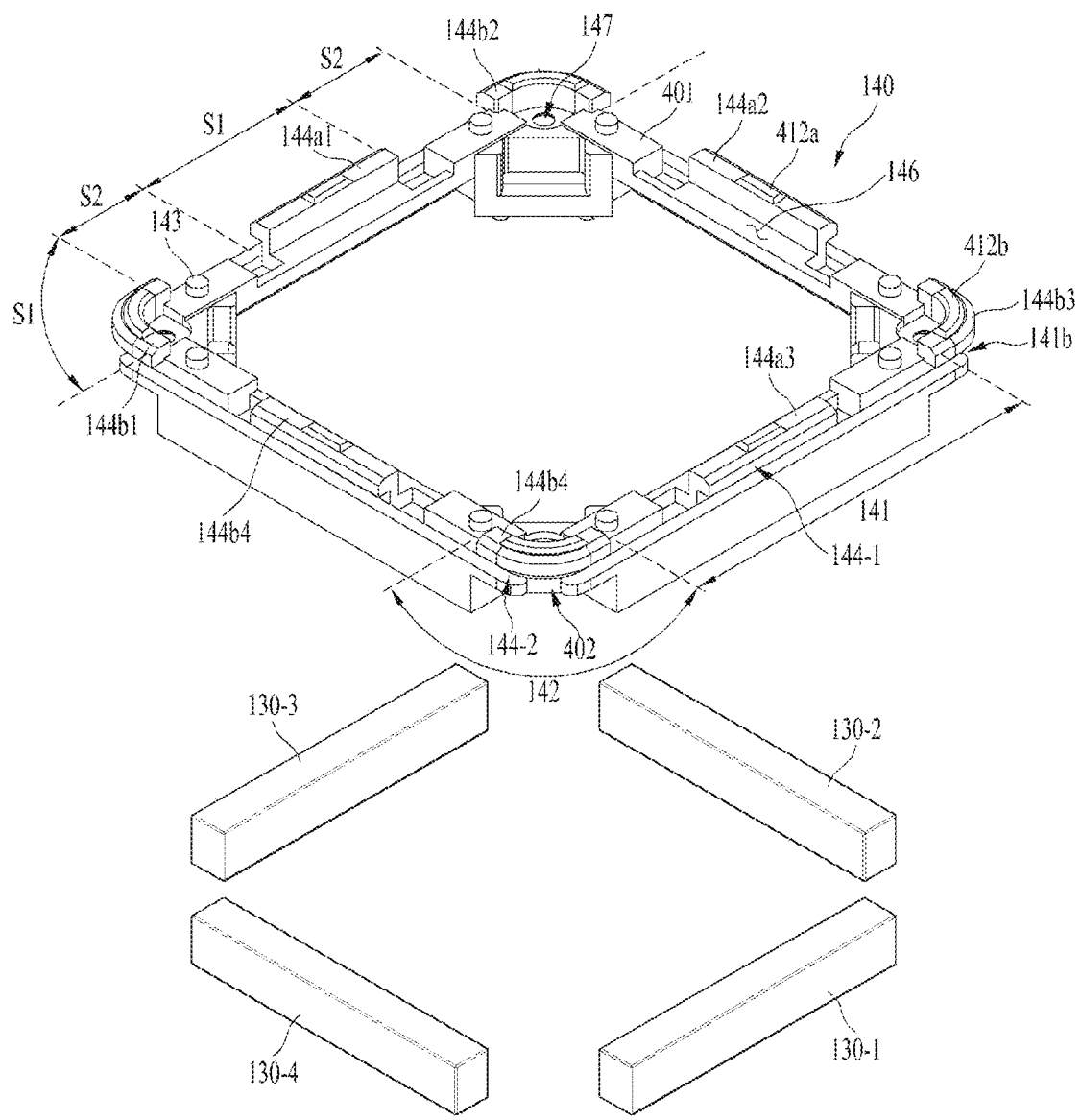
FIG. 4 illustrates a first exploded perspective view of a housing and a magnet illustrated in FIG. 1.
Figure 5:
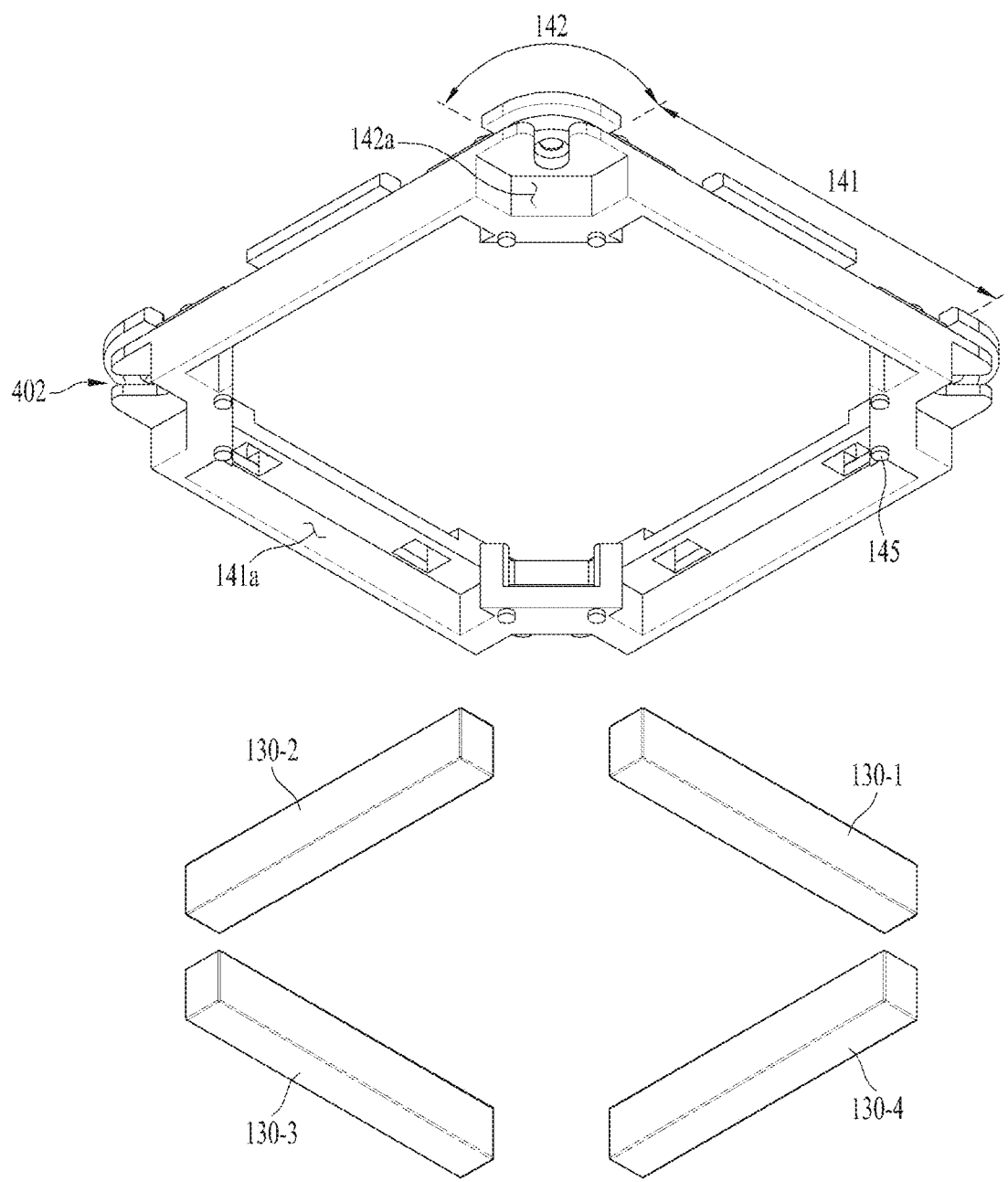
FIG. 5 illustrates a second exploded perspective view of the housing and the magnet illustrated in FIG. 1.

FIG. 4 illustrates a first exploded perspective view of the housing 140 and the magnet 130 illustrated in FIG. 1, and FIG. 5 illustrates a second exploded perspective view of the housing 140 and the magnet 130 illustrated in FIG. 1.

Referring to FIGS. 4 and 5, the housing 140 may include a plurality of side portions 141 and 142, which may have a hollow column shape overall to form a hollow region therein. For example, the housing 140 may include the plurality of side portions 141 and 142 each forming a polygonal (e.g., rectangular or octagonal) or circular hollow region therein.

The housing 140 may include an upper surface 401 and a side portion. The side portion of the housing 140 may include the plurality of side portions 141 and 142 and the upper surfaces of the side portions may define the upper surface 401 of the housing 140.

For example, the housing 140 may include first side portions 141, which are spaced apart from each other, and second side portions 142, which are spaced apart from each other.

For example, the length of each of the first side portions 141 of the housing 140 may be greater than the length of each of the second side portions 142. For example, the first side portions 141 of the housing 140 may correspond to the sides of the housing 140, and the second side portions 142 of the housing 140 may correspond to the corners of the housing 140.

The magnet 130 may be disposed or installed on the first side portions 141 of the housing 140.

Each of the second side portions 142 of the housing 140 may be located between two adjacent first side portions and may connect the first side portions 141 to each other.

A support member 220 may be disposed on the second side portions 142 of the housing 140.

For example, the support member 220 may pass through through-holes 147 provided respectively in the second side portions 142, and may be coupled to an outer frame 152 of the upper elastic member 150. For example, the through-holes 147 may be formed in the second side portions 142 of the housing 142 and the upper surface of the housing 140, which is adjacent to the second side portions 142.

The first side portions 141 of the housing 140 may the second side portions 142 of the housing 140 to each other and may include planes at a certain depth. Each of the first side portions 141 of the housing 140 may have an area equal to or greater than the area of a corresponding magnet 130.

The housing 140 may include a magnet seating portion 141a for accommodating the magnet 130 and a sensing coil seating groove 141b for winding or accommodating the sensing coil 170.

The magnet seating portion 141a may be provided at an inner lower end of at least one of the first side portions 141 of the housing 140. For example, the magnet seating portion 141a may be provided at the inner lower end of each of the first side portions 141, and each of the magnets 130 may be inserted into and fixed to a corresponding one of the magnet seating portions 141a.

The magnet seating portion 141a of the housing 140 may be formed as a groove corresponding to the size of the magnet 130. An opening may be formed in the bottom surface of the magnet seating portion 141a of the housing 140, which faces the second coil 240, and the lower surface of the magnet 130 fixed to the magnet seating portion 141a may face the second coil 230.

The sensing coil seating groove 141b in the housing 140 may be formed in a manner such that it is recessed from the outer surface of at least one of the first side portions 141 or the second side portions 142 of the housing 140, and may be formed from one end to the other end of the first side portions 141 and/or the second side portions 142. For example, the sensing coil seating groove 141b in the housing 140 may be provided in the upper end of the outer surface of the first and second side portions 141 and 142.

For example, the sensing coil seating groove 141b in the housing 140 may be spaced apart from the upper surface 401 of the housing 140, and may be provided in the upper end of the outer surface of the first and second side portions 141 and 142, without limitation thereto.

The depth of the sensing coil seating groove 141b may be greater than or equal to the thickness of the sensing coil 170 wound therein. For example, the sensing coil 170 disposed in the sensing coil seating groove 141b may not protrude from the outer surface of the first and second side portions of the housing 140. This serves to inhibit the sensing coil 170 disposed in the sensing coil seating groove 141b from being separated outward from the sensing coil seating groove 141b.

The sensing coil seating groove 141b may be provided above the magnet seating portion 141a in which the magnet 130 is seated. For example, the sensing coil seating groove 141b may do not overlap the magnet seating portion 141a in a direction orthogonal to the optical axis OA, without limitation thereto.

The first side portion 141 of the housing 140 may be disposed parallel to the side surface of the cover member 300. In addition, the area of the first side portion 141 of the housing 140 may be greater than the area of the second side portion 142.

The second side portion 142 of the housing 140 may have therein the through-hole 147, which defines a path through which the support member 220 passes. For example, the housing 140 may include the through-hole 147 formed from the top of the second side portion 142. The number of through-holes 147 may be the same as the number of support members.

In order to inhibit the sensing coil 170 disposed in the sensing coil seating groove 141b from being separated from the housing 140, the housing 140 may include a protruding portion 144, which protrudes from the upper surface 401 in the first direction. The protruding portion 144 may be provided on the sensing coil seating groove 141b and may inhibit the sensing coil 170 wound around the upper end of the side portion of the housing 140 from being separated outward from the side portion of the housing 140.

For example, the protruding portion 144 of the housing 140 may include first protruding portions 144a1 to 144a4 disposed on the upper end or the upper surface of the first side portions 141 of the housing 140 and second protruding portions 144*b*1 to 144*b*4 disposed on the upper end or the upper surface of the second side portions 142.

The first protruding portions 144*a*1 to 144*a*4 may be spaced apart from each other, and the second protruding portions 144*b*1 to 144*b*4 may be spaced apart from each other. In addition, the first protruding portions 144*a*1 to 144*a*4 and the second protruding portions 144*b*1 to 144*b*4 may be spaced apart from each other.

For example, each of the first protruding portions 144*a*1 to 144*a*4 may be disposed so as to be aligned with the center of the upper surface of a corresponding first side portion 141, and each of the second protruding portions 144*b*1 to 144*b*4 may be disposed so as to be aligned with the center of the upper surface of a corresponding second side portion 142.

For example, the outer circumferential surface of the respective first protruding portions 144*a*1 to 144*a*4 may be linear or line-shaped in the longitudinal direction, and the outer circumferential surface of the respective second protruding portions 144*b*1 to 144*b*4 may have a curved or bent shape in the longitudinal direction.

For example, the sensing coil seating groove 141*b* may be spaced apart from the lower ends of the first protruding portions 144*a*1 to 144*a*4 and the lower ends of the second protruding portions 144*b*1 to 144*b*4, without limitation thereto.

In another embodiment, the sensing coil seating groove 141*b* may be in contact with the lower ends of the first protruding portions 144*a*1 to 144*a*4 and the lower ends of the second protruding portions 144*b*1 to 144*b*4.

Stoppers 412*a* and 412*b* may be provided on the upper surface of the protruding portion 144 of the housing 140 in order to inhibit direct collision with the inner surface of the cover member 300 illustrated in FIG. 1.

For example, the housing 140 may include a first stopper 412*a*, which protrudes in the first direction from the upper surface of each of the first protruding portions 144*a*1 to 144*a*4, and a second stopper 412*b*, which protrudes in the first direction from the upper surface of each of the second protruding portions 144*b*1 to 144*b*4.

For example, the first stopper 412*a* may be provided so as to be aligned with the center of the corresponding first protruding portion and may be linear or line-shaped in the longitudinal direction, and the second stopper 412*b* may be provided so as to be aligned with the center of the corresponding second protruding portion and may have a curved or bent shape in the longitudinal direction.

At least one recess may be provided in the upper surface of the housing 140 located between the protruding portions 144*a*1 to 144*a*4 and 144*b*1 to 144*b*4.

For example, the upper surface of the side portions 141 and 142 of the housing 140 may include a first area S1 and a second area S2.

The protruding portion 144 of the housing 140 may correspond to the first area S1 of the upper surface 401 of the housing 140, and the protruding portion 144 may expose the second area S2 of the upper surface 401 of the housing 140, which is the remaining portion excluding the first area S1.

In addition, the recess in the housing 140 may correspond to the second area S2 of the upper surface 401 of the housing 140, and the second area S2 of the upper surface 401 of the housing 140 may be open or exposed to the outer surface and/or the inner surface of the side portion (e.g., 141) of the housing 140.

For example, the first area S1 of the housing 140 may have a structure that protrudes with respect to the second area S2, and the second area S2 may have a structure that is recessed with respect to the first area S1. Then, the second area S2 may have a structure that is open to the outer surface and/or the inner surface of the respective side portions 141 and 142 of the housing 140.

The sensing coil seating groove 141*b* may include a first groove 144-1 provided in the respective first side portions 141 and a second groove 144-2 provided in the respective second side portions 142.

Assuming that, on the basis of the through-hole 147, the side of the housing 140 oriented toward the hollow region is referred to as "inside" and the opposite side is referred to as "outside", the second groove 144-2 of the sensing coil seating groove 141*b* may be located outside the through-hole 147 through which the support member 220 passes.

For example, the second groove 144-2 of the sensing coil seating groove 141*b* may be located farther away from the optical axis OA or a virtual straight line that passes through the center of the hollow region of the housing 140 and is parallel to the optical axis OA than the through-hole 147.

For example, a first distance between the virtual straight line that passes through the center of the hollow region of the housing 140 and is parallel to the optical axis OA and the second groove 144-2 of the sensing coil seating groove 141*b* may be greater than a second distance between the through-hole 147 and the virtual straight line that passes through the center of the hollow region of the housing 140 and is parallel to the optical axis OA.

A portion of the second side portion 142 of the housing 140 may be disposed between the second groove 144-2 and the through-hole 147 in order to allow the support member 220 and the sensing coil 170 to be spaced apart from each other.

A depression or a groove 402 may be provided in the lateral portion of the second groove 144-2 provided in the respective second side portions 142.

The housing 140 may include at least one upper support protrusion 143, which is provided on the upper end or the upper surface thereof so as to be coupled to the outer frame 152 of the upper elastic member 150.

The upper support protrusion 143 of the housing 140 may be formed on the upper surface of at least one of the first side portions 141 or the second side portions 142 of the housing 140.

For example, the upper support protrusion 143 may be provided on the second area S2 of the upper surface 401 of the housing 140, which is located between the first protruding portions 144*a*1 to 144*a*4 and the second protruding portions 144*b*1 to 144*b*4.

In addition, the housing 140 may include a lower support protrusion 145, which is provided on the lower surface thereof so as to be coupled to and fixed to an outer frame 162 of the lower elastic member 160.

In order to define a path through which the support member 220 passes and to secure a space to be filled with a gel-type silicon that may serve as a damper, the housing 140 may include a groove 142*a* formed in the second side portion 142. For example, the groove 142*a* in the housing 140 may be filled with a damping silicon.

In order to inhibit the housing 140 from colliding with the cover member 300 when the housing 140 moves in the second direction and/or the third direction, the housing 140 may include at least one stopper (not illustrated), which protrudes in the second direction or the third direction from the outer surface of the respective first side portions 141.

In order to inhibit the bottom surface of the housing 140 from colliding with the base 210 and/or the circuit board 250, which will be described below, the housing 140 may further include a stopper (not illustrated), which protrudes from the lower surface. Through the provision of the stoppers formed on the upper surface 401 and the lower surface of the housing 140, the housing 140 may be downwardly spaced apart from the base 210 and may be upwardly spaced apart from the cover member 300, so as to maintain the height thereof in the direction of the optical-axis OA without vertical interference. Thus, the housing 140 may perform the shifting operation in the second and third directions, which are the longitudinal direction and the transverse direction in the plane orthogonal to the optical axis OA.

Next, the magnets 130 (130-1 to 130-4) will be described.

The magnet 130 may be disposed on the housing 140 such that at least a portion of the magnet overlaps the first coil 120 in a direction orthogonal to the optical axis OA. For example, the magnet 130 may be inserted into or disposed in the seating portion 141a of the housing 140.

The magnet 130 may be spaced apart from the sensing coil 170 mounted on the housing 140, and a portion of the housing 140 may be disposed between the sensing coil and the magnet 130.

The magnet 130 may be disposed under the sensing coil 170.

For example, in order to reduce interference between the magnet 130 and the sensing coil 170, the magnet 130 and the sensing coil 170 may be arranged so as not to overlap each other in the direction of the optical axis OA at the initial position thereof, but the embodiment is not limited thereto, and in another embodiment, the two may be arranged so as to overlap each other.

For example, the sensing coil 170 may be disposed on the outer surface of the first and second side portions 141 and 142 of the housing 140, and the magnet 130 may be disposed on the inner surface of the respective first side portions 141 of the housing 140.

In another embodiment, each of the magnets 130 may be disposed on the outer surface of a corresponding first side portion 141 of the housing 140 so as to be spaced apart from the sensing coil 170.

The magnet 130 may have a shape corresponding to that of the first side portion 141 of the housing 140, for example, a rectangular parallelepiped shape, without limitation thereto.

The magnet 130 may be formed as one body, and may be disposed such that the surface thereof that faces the first coil 120 serves as an S-pole and the opposite surface serves as an N-pole. However, the disclosure is not limited thereto, and the poles of the magnet may be reversed.

At least two magnets 130 may be provided on the housing 140, and may be arranged so as to face each other. For example, the magnet 130 may have a substantially rectangular planar surface, or alternatively may have a triangular or rhombic shape.

For example, the magnets 130 may be disposed on two first side portions, which face each other, among the first side portions 141 of the housing 140.

Next, the upper elastic member 150, the lower elastic member 160, and the support member 220 will be described.

The upper elastic member 150 and the lower elastic member 160 support the bobbin 110 by elasticity thereof. The upper elastic member 150 is connected to the upper portion of the bobbin 110 and the upper portion of the housing 140 to support the upper portion of the bobbin 110 and the upper portion of the housing 140. The lower elastic member 160 is connected to the lower portion of the bobbin 110 and the lower portion of the housing 140 to support the lower portion of the bobbin 110 and the lower portion of the housing 140.

At least a portion of the upper elastic member 150 may be disposed on the upper surface of the side portions 141 and 142 of the housing 140 between the protruding portions 144a1 to 144a4 and 144b1 to 144ab. For example, at least a portion of the upper elastic member 150 may be disposed on the upper surface of the first side portions 141 of the housing 140 between the first protruding portions 144a1 to 144a4 and the second protruding portions 144b1 to 144b4.

For example, a portion of the outer frame 152 of the upper elastic member 150 may be disposed on the upper surface of the first side portions 141 of the housing 140 between the first protruding portions and the second protruding portions.

A portion 901, in which a first coupling portion 510 and the frame connection portion 153 of the upper elastic member 150 are connected to each other, may be disposed on the upper surface of the first side portions 141 of the housing 140 between the first protruding portions 144a1 to 144a4 and the second protruding portions 144b1 to 144b4.

In addition, at least a portion of the upper elastic member 150 may be disposed in at least one recess in the upper surface of the housing 140. The at least one recess in the housing 140 may be open to the outer surface and/or the inner surface of the side portion of the housing 140, and at least the portion of the upper elastic member 150 disposed in the at least one recess may be exposed to the outer surface of the side portion of the housing 140.

In addition, for example, the at least one recess in the housing 140 may be provided in the same side portion of the housing 140 on which the magnet 130 is disposed, but the disclosure is not limited thereto. In another embodiment, the at least one recess in the housing 140 may be provided in the side portion of the housing 140 other than the side portion on which the magnet 130 is disposed.

In addition, the at least one recess in the housing 140 may be provided adjacent to at least one side of the upper surface of the housing 140.

At least a portion of the outer frame of the upper elastic member 150 may be disposed in at least one recess in the housing 140. The sensing coil 170 may be spaced apart from the upper elastic member 150 disposed in the recess in the housing 140, and at least the portion of the outer frame of the upper elastic member 150 disposed in the at least one recess may overlap the sensing coil 170 in the optical-axis direction.

For example, at least one recess in the housing 140 may include a bottom and a side surface, the sensing coil 170 may be disposed under the bottom of the recess in the housing 140, and at least a portion of the upper elastic members 150 may be disposed in contact with the bottom of the recess.

The upper support protrusion 143 may be provided on the bottom of the at least one recess in the housing 140 so as to be coupled to the outer frame of the upper elastic member 150.

The depth of the bottom of the at least one recess in the housing 140 may be greater than or equal to the height of at least the portion of the upper elastic member 150 disposed on the bottom of the recess in order to inhibit the upper elastic member 150 from being separated. That is, on the basis of the bottom of the recess in the housing 140, the height of the upper end or the upper surface of the upper elastic member 150 disposed in the recess may be less than or equal to the height of the upper end or the upper surface of the protruding portion of the housing 140.

The support member 220 may movably support the housing 140 relative to the base 210 in a direction orthogonal to the optical axis OA, and may electrically connect at least one of the upper or lower elastic member 150 or 160 to the circuit board 250. For example, the support member 220 may electrically connect the upper elastic member 150 to the circuit board 250.

The upper elastic member 150 is not limited to that illustrated in FIG. 2, and a description related to an upper elastic member 1600 illustrated in FIG. 20, which will be described below, may be applied to the upper elastic member 150.

Figure 20:
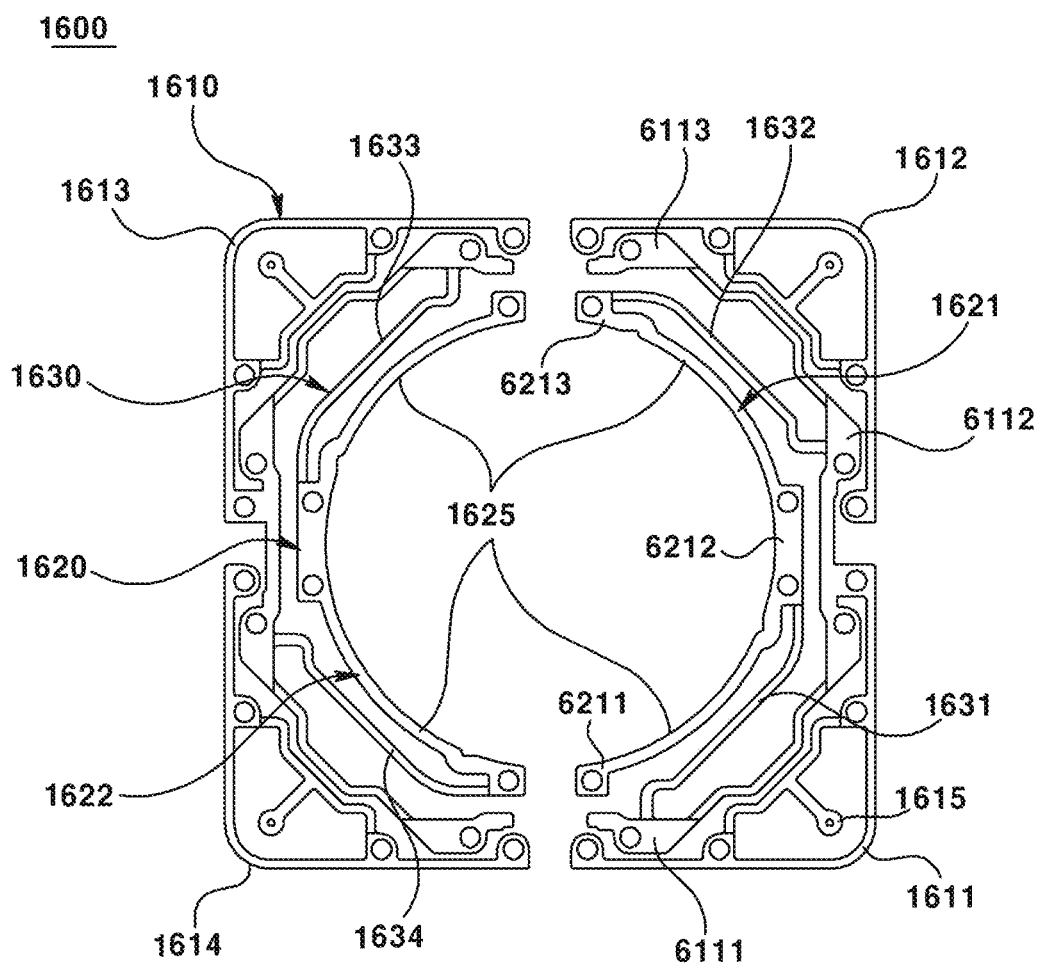
FIG. 20 is a plan view illustrating an upper elastic member of FIG. 17.

For example, referring to FIG. 20, the upper elastic member according to another embodiment may include an outer frame 1610 coupled to the upper portion of the housing 140, an inner frame 1620 coupled to the upper portion of the bobbin 110, and a frame connection portion 1630 connecting the outer frame 1610 and the inner frame 1620 to each other.

The outer frame 1610 may include a first outer portion 1611, a second outer portion 1612, a third outer portion 1613, and a fourth outer portion 1614.

The first outer portion 1611 may be connected to the inner frame 1620 via the frame connection portion 1630, and the second outer portion 1612 may be spaced apart from the frame connection portion 1630 and the inner frame 1620 of the first outer portion 1611.

The first and third outer portions 1611 and 1613 may be electrically connected to the first coil 120, and the second and fourth outer portions 1612 and 1614 may be electrically connected to the sensing coil 170.

The first to fourth outer portions 1611, 1612, 1613 and 1614 may be located on the corners of the housing 140, for example, on the second side portions 142. For example, the first to fourth outer portions 1611, 1612, 1613 and 1614 may extend along the side surfaces from the corner portions of the housing 140.

The inner frame 1620 may include a first inner portion 1621 and a second inner portion 1622, which are coupled to the bobbin 110 and are spaced apart from each other. The first inner portion 1621 may be electrically connected to one end of the first coil 120, and the second inner portion 1622 may be electrically connected to the other end of the first coil.

The inner frame 1620 may include a first inner coupling portion 6211 coupled to a first side portion of the bobbin 110, a second inner coupling portion 6212 coupled to a second side portion of the bobbin 110, and a third inner coupling portion 6213 coupled to a third side portion of the bobbin 110.

In addition, the inner frame 1620 may further include a dummy portion 1625 connecting the first inner coupling portion 6211 and the second inner coupling portion 6212 to each other. In addition, the inner frame 1620 may further include the dummy portion 1625 connecting the second inner coupling portion 6212 and the third inner coupling portion 6212 to each other.

The frame connection portion 1630 may include first to fourth connection portions 1631, 1632, 1633 and 1634 spaced apart from each other.

The first outer portion 1611 may be connected to the first inner portion 1621 through the first connection portion 1631 and the second connection portion 1632, the third outer portion 1613 may be connected to the second inner portion 1622 through the third connection portion 1633 and the fourth connection portion 1634, and the fourth outer portion 1614 may be spaced apart from the frame connection portion 1630 and the inner frame 1620.

The second outer portion 1612 and the fourth outer portion 1614 may not be coupled to the bobbin 110, but may be coupled only to the housing 140.

Figure 18:
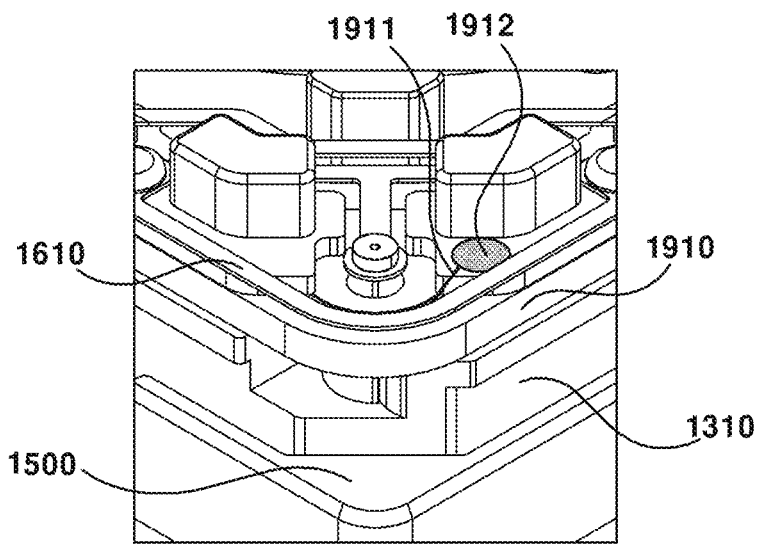
FIG. 18 is a perspective view illustrating a portion of the lens driving device of FIG. 16.
Figure 19:
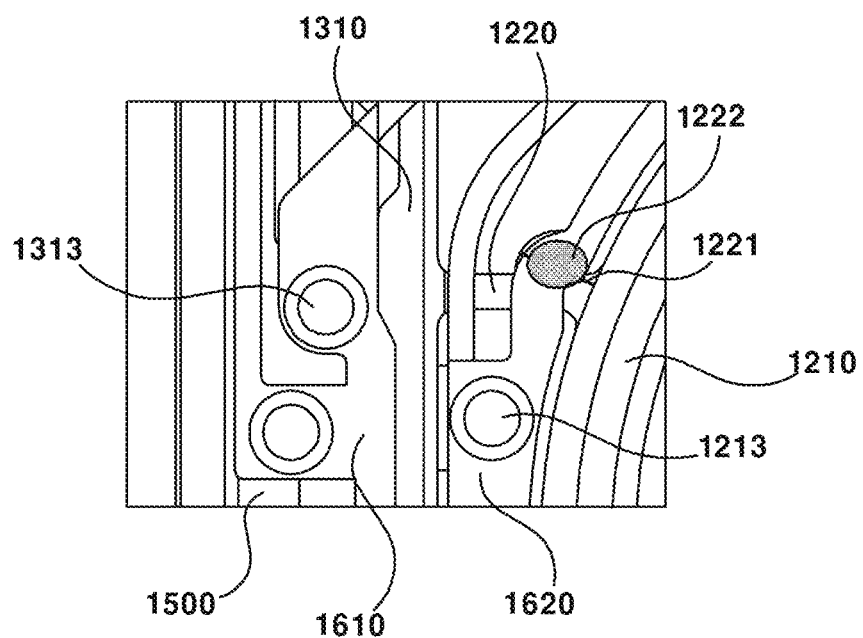
FIG. 19 is a perspective view illustrating another portion of the lens driving device of FIG. 16.

As illustrated in FIG. 18, a lead wire of the sensing coil 170 may be coupled to the outer frame 1610 by a solder element 1912. In addition, as illustrated in FIG. 19, the lead wire of the first coil 120 may be coupled to the inner frame 1620 by a solder element 1222.

Figure 6:
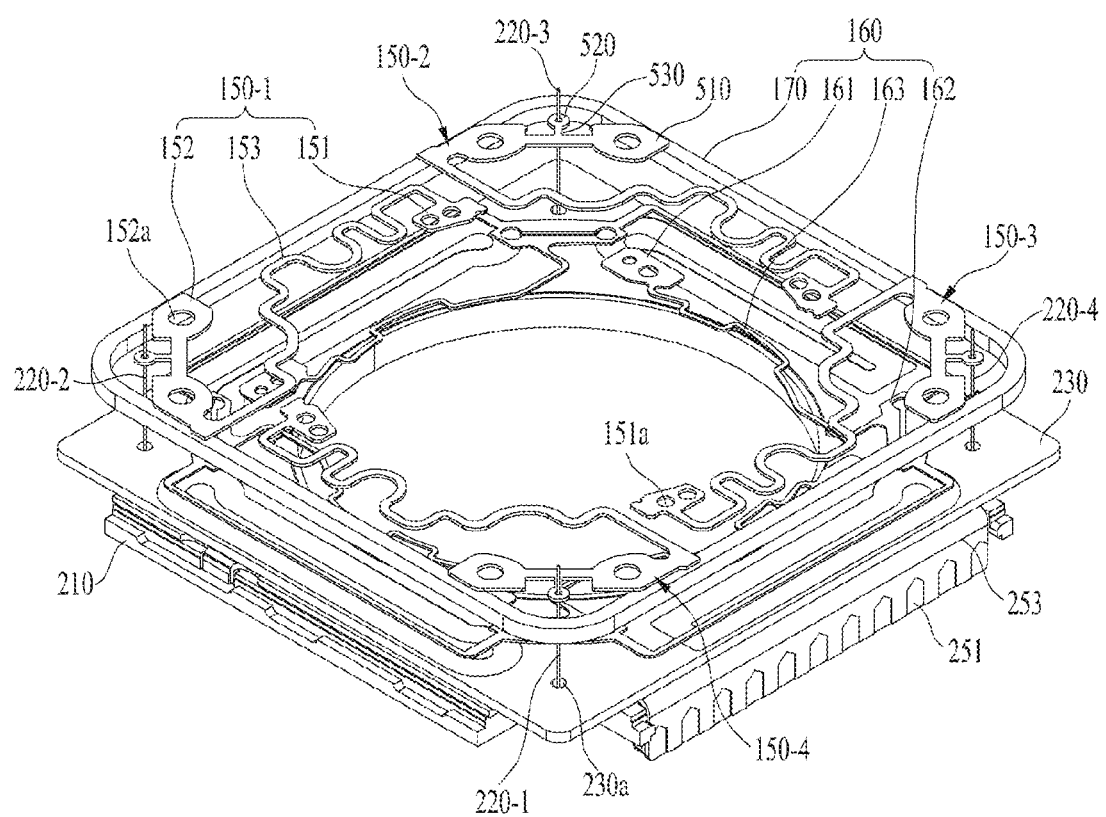
FIG. 6 illustrates an assembled perspective view illustrating an upper elastic member, a lower elastic member, a base, a second coil, a support member, and a circuit board illustrated in FIG. 1.

FIG. 6 illustrates an assembled perspective view of the upper elastic member 150, the lower elastic member 160, the base 210, the support member 220, the second coil 230, and the circuit board 250 illustrated in FIG. 1.

Referring to FIG. 6, the upper elastic member 150 may be divided into two or more pieces.

For example, the upper elastic member 150 may include first to fourth upper elastic members 150-1 to 150-4, which are electrically separated from each other and are spaced apart from each other. For example, the separated first to fourth upper elastic members 150-1 to 150-4 may be arranged so as to be point symmetrical in the x-y plane about the center of the bobbin 110 or the housing 140. Here, "point symmetry" means symmetry in which two shapes overlap each other when the two shapes are rotated by 180 degrees about one rotation center point.

Any one of the first to fourth upper elastic members 150-1 to 150-4 may be electrically connected to a corresponding one of support members 220. For example, each of the first to fourth upper elastic members 150-1 to 150-4 may be directly connected to a corresponding one of first to fourth support members 220-1 to 220-4.

Each of the first to fourth upper elastic members 150-1 to 150-4 may include an inner frame 151 connected to the bobbin 110, an outer frame 152 connected to the housing 140, and a frame connection portion 153 connecting the outer frame 152 and the inner frame 151 to each other.

For example, the inner frame 151 may be provided with a through-hole 151a to which the upper support protrusion 113 of the bobbin 110 is coupled, and the outer frame 152 may be provided with a through-hole 152a, to which the upper support protrusion 143 of the housing 140 is coupled.

Two upper elastic members selected from among the first to fourth upper elastic members 150-1 to 150-4 may be connected to both ends of the first coil 120. For example, the inner frames of the two upper elastic members selected from among the first to fourth upper elastic members 150-1 through 150-4 may be electrically connected to both ends of the first coil 120.

In addition, the other two upper elastic members selected from among the first to fourth upper elastic members 150-1 to 150-4 may be connected to both ends of the sensing coil 170. For example, the outer frames of the two upper elastic members selected from among the first to fourth upper elastic members 150-1 to 150-4 may be electrically connected to both ends of the sensing coil 170.

For example, through soldering, a leading end portion of the sensing coil 170 may be directly bonded to the outer frame of any one of the first to fourth upper elastic members 150-1 to 150-4, and a trailing end portion of the sensing coil 170 may be directly bonded to the outer frame of any other one of the first to fourth upper elastic members 150-1 to 150-4.

In addition, the outer frame 152 of each of the first to fourth upper elastic members 150-1 to 150-4 may be connected to at least one of the support members 220-1 to 220-4. For example, each of the outer frames 152 of the first to fourth upper elastic members 150-1 to 150-4 may be connected to one end of a corresponding one of the support members 220-1 to 220-4.

The frame connection portion 153 of the upper elastic member 150 may be bent at least once to form a pattern having a predetermined shape. Upward movement and/or downward movement of the bobbin 110 in the first direction may be elastically supported by a change in position and micro-deformation of the frame connection portion 153 of the upper elastic member 150.

The outer frame 152 of each of the first and fourth upper elastic members 150-1 to 150-4 may include the first coupling portion 510 coupled to the housing 140, a second coupling portion 520 coupled to a corresponding support member 220, and a connection portion 530 connecting the first and second coupling portions 510 and 520 to each other.

One end of the respective support members 220-1 to 220-4 may be directly bonded to the second coupling portion 520 of the outer frame 152 of the upper elastic member 150 through soldering or using a conductive adhesive member (e.g., conductive epoxy), for example.

The first coupling portion 510 of the upper elastic member 150 is connected at one end thereof to the frame connection portion 153, and has a through-hole 152a to which the upper support protrusion 143 of the housing 140 is coupled.

The connection portion 530 of the outer frame 152 of each of the first and fourth upper elastic members 150-1 to 150-4 may be straight or bent at least once, and the width of the connection portion 530 may be less than the width of the frame connection portion 153 of the upper elastic member 150.

Since the width of the connection portion 530 is less than the width of the frame connection portion 153 of the upper elastic member 150, the connection portion 530 may be easily moved in the first direction, which may disperse the stress applied to the upper elastic member 150 and the stress applied to the support member 220.

For example, the second coupling portion 520 of the upper elastic member 150 may include a through-hole through which the support member 220 passes, without limitation thereto.

The lower elastic member 160 may include the inner frame 161 coupled with the lower support protrusion of the bobbin 110, the outer frame 162 coupled to the lower support protrusion of the housing 140, and the frame connection portion 163 connecting the inner frame 161 and the outer frame to each other.

In FIG. 6, the lower elastic member 160 is not divided, but may be divided into two or more pieces in another embodiment.

Next, the sensing coil 170 will be described.

The sensing coil 170 is disposed on the side portion of the housing 140, for example, the side portions 141 and 142 of the housing 140. For example, the sensing coil 170 may be directly wound in the sensing coil seating groove 141b, which is provided in the first and second side portions 141 and 142 of the housing 140, so as to rotate in a clockwise or counterclockwise direction about the optical axis OA. For example, the sensing coil 170 may be directly wound on the housing 140 in a ring shape.

When the sensing coil is implemented as a coil block and is bonded to the upper end of the housing 140, a manual operation for seating and bonding the sensing coil is required. In this case, since it is not easy to implement the sensing coil in the form of a block so as to match the shape of the upper surface of the housing and since the sensing coil is bonded to the housing through the manual operation, reliability of adhesion between the sensing coil and the housing may be deteriorated. In addition, since the sensing coil is disposed adjacent to the upper elastic member on the upper end of the housing, the installation of the upper elastic member may be limited, and bonding with the upper elastic member and soldering operation are not easy.

On the other hand, in the embodiment, since the sensing coil 170 is directly wound in the sensing coil seating groove 141b, which is provided in the first and second side portions of 141 and 142 of the housing 140, no manual operation for seating and bonding the sensing coil 170 to the upper end of the housing 140 is required, which may inhibit deterioration in bonding reliability between the sensing coil 170 and the housing 140 and between the sensing coil 170 and the upper elastic member 150.

In addition, since the sensing coil 170 is disposed under the upper elastic member 150, there is no spatial limitation when the upper elastic member 150 is installed to the upper end of the housing 140.

Since each of the leading end portion and the trailing end portion of the sensing coil 170 is disposed so as to be in contact with a region of the first sidewall 141 or the second sidewall 142 of the housing 140 and is bonded to a region of the outer frame 152 of the upper elastic member 150 through soldering, the embodiment may ensure easy implementation of soldering.

The driving signal applied to the first coil 120 may be an alternating current signal (e.g., alternating current). For example, the alternating current signal may be a sinusoidal signal or a pulse signal (e.g., a pulse width modulation (PWM) signal). Alternatively, in another embodiment, the driving signal applied to the first coil 120 may include an alternating current signal (e.g., alternating current) and a direct current signal (e.g., direct current). The application of the alternating current signal to the first coil 120 serves to generate an electromotive force or an inductive voltage in the sensing coil 170 by interactive induction.

The first coil 120 may be moved in the first direction together with the bobbin 110 by the electromagnetic force caused by the electromagnetic interaction between the current flowing in the first coil 120 and the magnet 130 in response to the driving signal.

As the first coil 120 moves in the first direction, the distance between the first coil 120 and the sensing coil 170 changes. As the distance changes, an inductive voltage may be generated in the sensing coil 170. For example, as the distance decreases, the inductive voltage generated in the sensing coil 170 may increase. Conversely, as the distance increases, the inductive voltage generated in the sensing coil 170 may decrease.

The displacement of the first coil 120 and the bobbin 110 may be detected based on the voltage induced in the sensing coil 170, and feedback control of the displacement or driving signal of the bobbin 110 may be implemented based on the detected displacement.

The sensing coil 170 may be disposed under the upper elastic member 150, which is disposed on the upper surface of the housing 140, and may be disposed above the magnet 130, which is disposed on the housing 140.

At least a portion of the sensing coil 170 disposed on the housing 140 may overlap the protruding portion 144 of the housing 140 in the first direction, but the disclosure is not limited thereto. In another embodiment, at least a portion of the sensing coil 170 may do not overlap the protruding portion 144 of the housing 140.

Next, the support member 220 will be described.

A plurality of support members 220 may be provided, and the plurality of support members 220-1 to 220-4 may be disposed so as to correspond to the second side portions 142 of the housing 140. For example, each of the plurality of support members 220-1 to 220-4 may be disposed adjacent to a corresponding one of the four second side portions 142, and one end of the support member 220 may be bonded to the outer frame 152 of the upper elastic member 150 disposed on the corresponding second side portion. Alternatively, in another embodiment, the support member 220 may be disposed in the form of a leaf spring on the first side portion 141 of the housing 140.

The plurality of support members 220-1 to 220-4 may define a path, through which the driving signal is transferred from the circuit board 250 to the first coil 120, and may also define a path, through which the inductive voltage output from the sensing coil 170 is transferred to the circuit board 250.

The plurality of support members 220-1 to 220-4 may be realized by a member capable of providing elastic support force, for example, a leaf spring, a coil spring, a suspension wire, or the like. In addition, in another embodiment, the support member 220 may be integrally formed with the upper elastic member.

The plurality of support members 220-1 to 220-4 may be spaced apart from the housing 140, and may be directly connected to the connection portion 530 of the outer frame 153 of the upper elastic member 150, rather than being fixed to the housing 140.

The connection portion 530 of the outer frame 153 of the upper elastic member 150 is spaced apart from the housing 140, and therefore, is easily movable in the first direction.

Since the support members 220-1 to 220-4 according to the embodiment are directly connected to the connection portion 530, which is easily movable in the first direction, the support members may more easily move in the first direction than a general support member fixed to the housing 140, which may improve the accuracy of hand-tremor compensation. In particular, stress due to dropping and other kinds of impact may be dispersed, and deformation and disconnection of the support members 220-1 to 220-4 due thereto may be suppressed.

The first to fourth upper elastic members 150-1 to 150-4 may be electrically connected to the circuit board 250 through the support members 220-1 to 220-4.

For example, both ends of the first coil 120 may be connected to the inner frames 151 of the first and second upper elastic members 150-1 and 150-2, and may be electrically connected to the circuit board 250 by the first and second upper elastic members 150-1 and 150-2 and the support members 220-2 and 220-3.

In addition, for example, both ends of the sensing coil 170 may be connected to the inner frames 151 of the third and fourth upper elastic members 150-3 and 150-4, and may be electrically connected to the circuit board 250 by the third and fourth upper elastic members 150-3 and 150-4 and the support members 220-1 to 220-4.

The support members 220-1 to 220-4 may be located inside the ring-shaped sensing coil 170.

Next, the base 210, the circuit board 250, and the second coil 230 will be described.

The base 210 may include a hollow region, which corresponds to the hollow region of the bobbin 110 and/or hollow region of the housing 140, and may have a shape that matches or corresponds to that of the cover member 300, for example, a rectangular shape.

Figure 7:
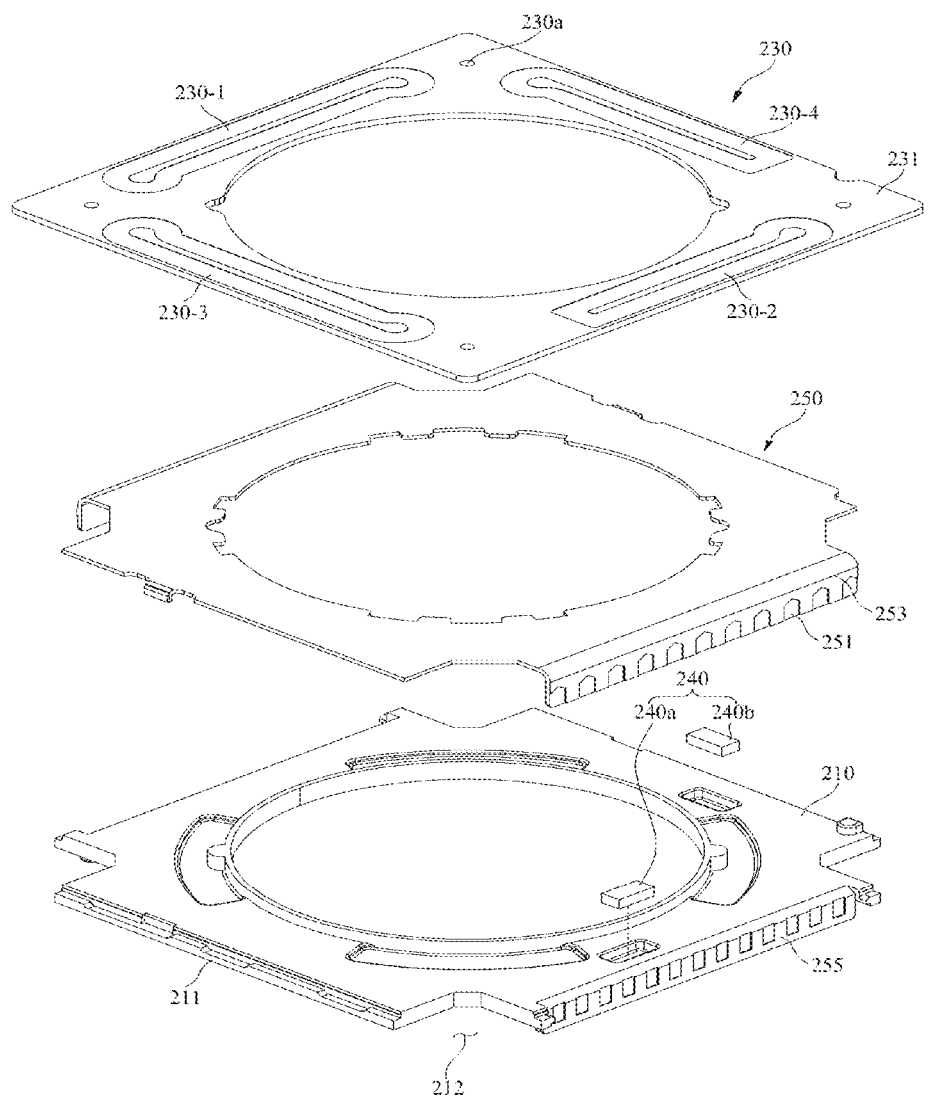
FIG. 7 illustrates an exploded perspective view of the second coil, the circuit board, and the base illustrated in FIG. 1.

FIG. 7 illustrates an exploded perspective view of the base 210, the second coil 230, and the circuit board 250 illustrated in FIG. 1.

Referring to FIG. 7, the base 210 may include a stepped portion 211 to which an adhesive may be applied when bonding and fixing the cover member 300. Here, the stepped portion 211 may guide the cover member 300 coupled to the upper side thereof, and may be coupled to the end of the cover member 300 in a surface contact manner.

A supporting portion 255 may be formed on the surface of the base 210 that faces the portion of the circuit board 250 on which a terminal 251 is formed, so as to have a size corresponding to that of the surface of the base. The supporting portion 255 of the base 210 may be formed without the stepped portion 211 so as to have a certain cross section from the outer surface of the base 210, and may serve to support a terminal surface 253 of the circuit board 250.

The edge of the base 210 may have a groove 212. When the edge of the cover member 300 has a protruding shape, the protruding portion of the cover member 300 may be fastened to the groove 212 in the base 210.

In addition, the upper surface of the base 210 may be provided with seating grooves 215-1 and 215-2 in which the OIS position sensor 240 may be disposed. According to the embodiment, the base 210 may be provided with two seating grooves 215-1 and 215-2 and the OIS position sensor 240 may be disposed in the seating grooves 215-1 and 215-2 of the base 210 so as to sense that the degree of movement of the housing 140 in the second direction and the third direction. To this end, virtual lines connecting the centers of the seating grooves 215-1 and 215-2 of the base 210 and the center of the base 210 may intersect each other. For example, the angle formed by the virtual lines connecting the centers of the seating grooves 215-1 and 215-2 of the base 210 and the center of the base 210 may be 90°, without limitation thereto.

The second coil 230 may be disposed on the upper side of the circuit board 250, and the OIS position sensor 240 may be disposed on the lower side of the circuit board 250.

The OIS position sensor 240 may sense the displacement of the housing 140 relative to the base 210 in a direction (e.g., the X axis or Y axis) orthogonal to the optical axis OA (e.g., the Z axis). For example, the OIS position sensor 240 may sense a change in the magnetic force of the magnet 130 due to the movement of the housing 140, and may output a signal based on the sensed result.

The OIS position sensor 240 may include a first OIS position sensor 240a and a second OIS position sensor 240b, which are arranged so as to be orthogonal to each other in order to sense the displacement of the housing 140 in a direction orthogonal to the optical axis OA.

The circuit board 250 may be disposed on the upper surface of the base 210, and may have a hollow region corresponding to the hollow region of the bobbin 110, the hollow region of the housing 140, and/or the hollow region of the base 210. The shape of the outer circumferential surface of the circuit board 250 may have a shape that matches or corresponds to that of the upper surface of the base 210, for example, a rectangular shape.

The circuit board 250 may at least one terminal surface 253 on which a plurality of terminals 251 or pins, which is bent from the upper surface and receives electrical signals from the outside, is formed.

In FIG. 7, the second coil 230 is provided in a circuit member 231 separate from the circuit board 250, but the disclosure is not limited thereto. In another embodiment, the second coil 230 may be implemented in the form of a ring-shaped coil bock, may be implemented in the form of an FP coil, or may be implemented in the form of a circuit pattern formed on the circuit board 250.

A through-hole 230*a* may be formed in the circuit member 231 in which the second coil 230 is formed. The support member 220 may be electrically connected to the circuit board 250 by passing through the through-hole 230*a*.

The second coil 230 is disposed on the circuit board 250 so as to face the magnet 130 disposed on the housing 140.

A total of four second coils 230 may be provided on four sides of the circuit board 250, but the disclosure is not limited thereto. Only two second coils may be provided respectively in the second direction and the third direction, or more than four second coils may be provided.

Hand-tremor compensation may be performed when the housing 140 moves in the second direction and/or the third directions via the interaction of the magnet 130 and the second coil 230 disposed so as to face each other.

The OIS position sensors 240*a* and 240*b* may be provided as hall sensors, or any other sensor capable of sensing the strength of a magnetic field may be used. For example, the OIS position sensors 240*a* and 240*b* may be implemented in the form of a driver including a hall sensor, or may be implemented only as a position detection sensor alone such as a hall sensor.

The OIS position sensors 240*a* and 240*b* may sense the displacement of the housing 140, and the OIS feedback operation may be performed using the sensed displacement.

The plurality of terminals 251 may be provided on the terminal surface 253 of the circuit board 250.

For example, the plurality of terminals 251 provided on the terminal surface 253 of the circuit board 250 may receive external power so as to supply the power to the first and second coils 120 and 230 and the OIS position sensor 240, may receive the inductive voltage output from the sensing coil 170 so as to output the voltage to the outside, and may receive an output signal from the OIS position sensor 240 so as to output the signal to the outside.

According to the embodiment, the circuit board 250 may be formed of an FPCB, without limitation thereto, and the terminals of the circuit board 250 may be directly formed on the surface of the base 210 using a surface electrode method or the like.

The circuit board 250 may include through-holes 250*a*1 and 250*a*2, through which the support member 220 may pass. The support member 220 may be electrically connected to a corresponding circuit pattern, which may be disposed on the lower surface of the circuit board 250, through the through-holes 250*a*1 and 250*a*2 in the circuit board 250 through soldering or the like.

In addition, in another embodiment, the circuit board 250 may not include the through-holes 250*a*1 and 250*a*2, and the support member 220 may be electrically connected to a circuit pattern or a pad, which is formed on the upper surface of the circuit board 250, through soldering or the like.

The circuit board 250 may further include a through-hole 250*b*, to which an upper support protrusion 217 of the base 210 is coupled.

Figure 8:
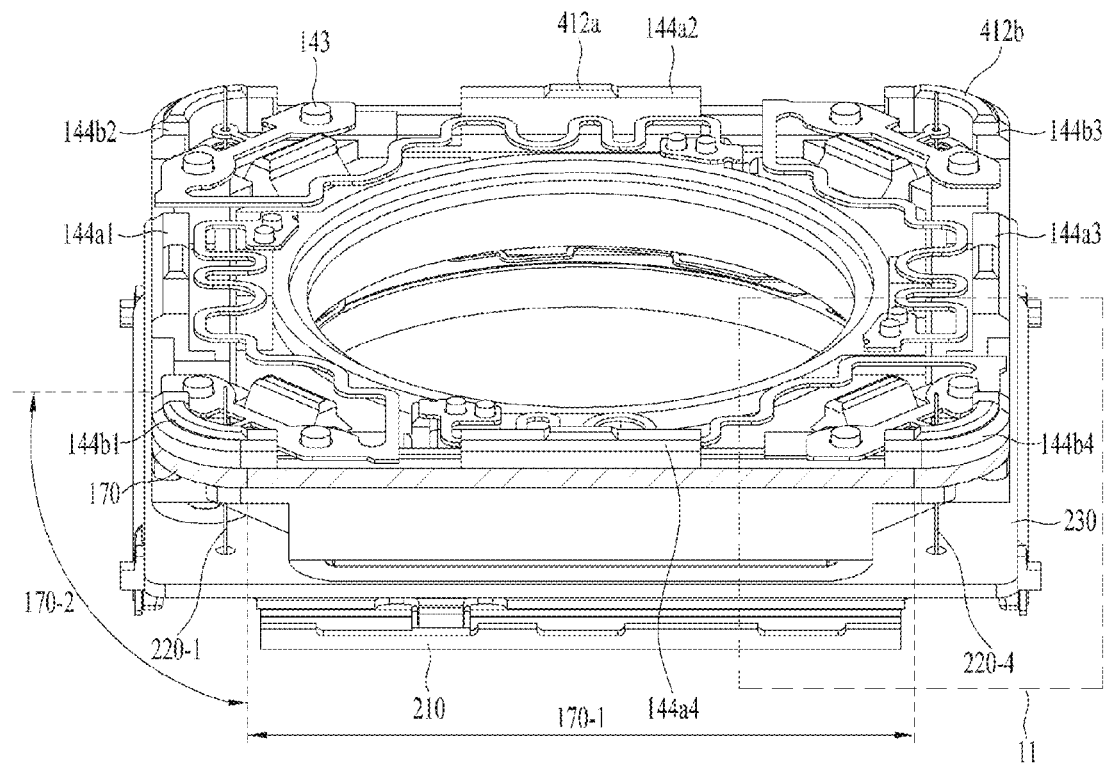
FIG. 8 illustrates a side perspective view of the lens driving device illustrated in FIG. 2.
Figure 9:
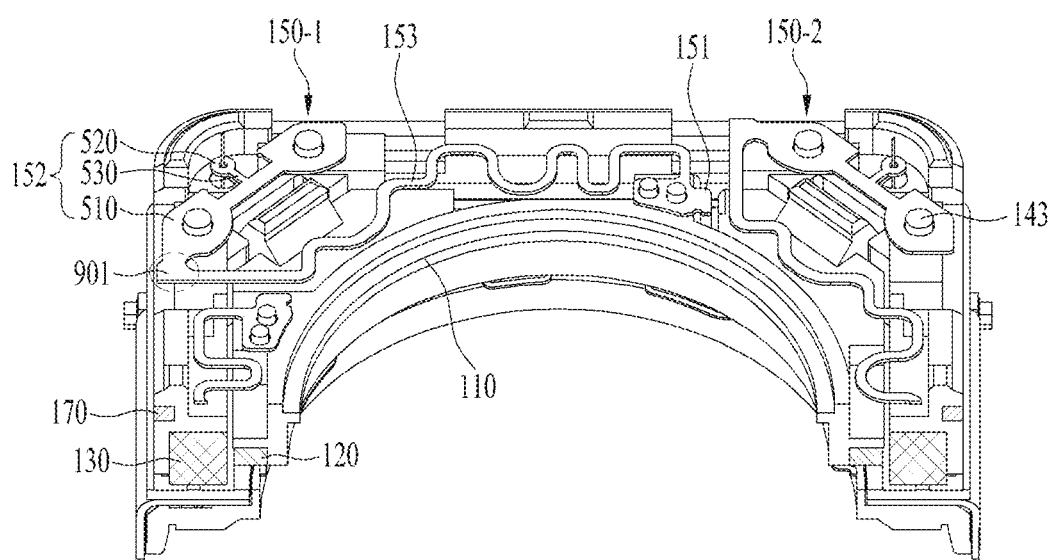
FIG. 9 illustrates a cross-sectional view taken along line I-I' of the lens driving device illustrated in FIG. 2.
Figure 10:
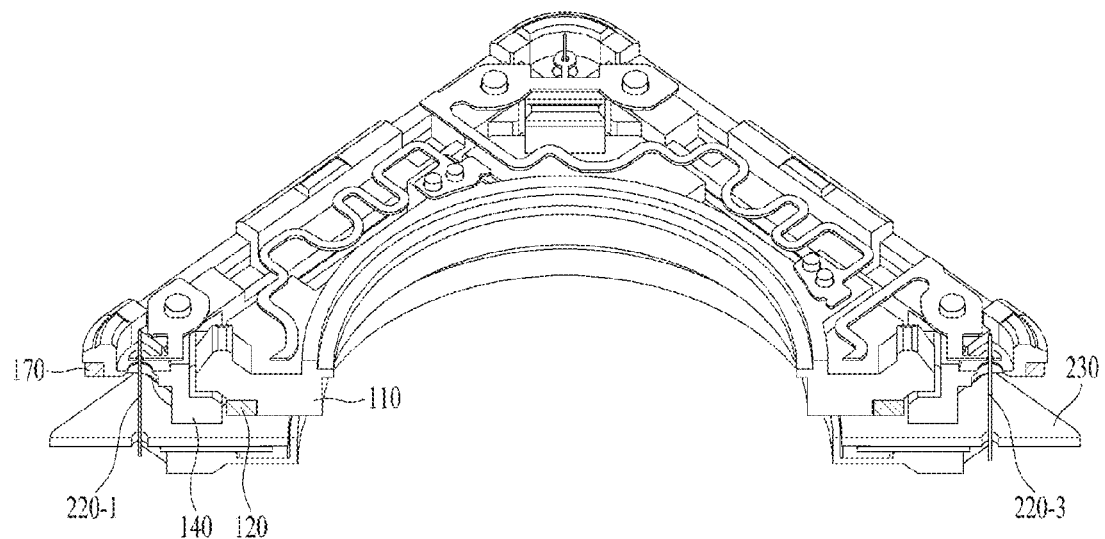
FIG. 10 illustrates a cross-sectional view taken along line II-II' of the lens driving device illustrated in FIG. 2.

FIG. 8 illustrates a side perspective view of the lens driving device illustrated in FIG. 2, FIG. 9 illustrates a cross-sectional view taken along line I-I' of the lens driving device illustrated in FIG. 2, and FIG. 10 illustrates a cross-sectional view taken along line II-II' of the lens driving device illustrated in FIG. 2.

Referring to FIGS. 8 to 10, the sensing coil 170 is directly wound in the sensing coil seating groove 141*b* provided in the first side surfaces 141 and the second side surfaces 142 of the housing 140.

At the initial position, the sensing coil 170 may do not overlap the magnet 130 in a direction orthogonal to the first direction. This serves to reduce interference between the magnet 130 and the sensing coil 170.

The initial position may be the initial position of the AF movable unit in the state in which no power is applied to the first coil 120, or may be the position at which the AF movable unit is placed as the upper and lower elastic members 150 and 160 are elastically deformed only by the weight of the AF movable unit. The AF movable unit may include the bobbin 110 and the constituent elements mounted in the bobbin 110.

In addition, at the initial position, the sensing coil 170 may be spaced apart from the first coil 120 by a predetermined distance in the first direction and may do not overlap the first coil 120 in a direction orthogonal to the first direction. Maintaining the predetermined distance between the first coil and the sensing coil 170 in the first direction ensures the linearity of the inductive voltage that is induced in the sensing coil 170 by the current of the first coil 120.

At the initial position, the sensing coil 170 may overlap the magnet 130 in the first direction, but the disclosure is not limited thereto. In another embodiment, the two may do not overlap each other in the first direction.

The sensing coil 170 may be directly wound around the side portion of the housing 140 so that at least a portion thereof is located outside the support member 220. For example, the outer side of the support member 220 may be opposite the center of the hollow region of the housing 140.

The support member 220 may be located between the first coil 120 and the sensing coil 170 in a direction orthogonal to the optical axis OA.

The sensing coil 170 may include first portions 170-1 (see FIG. 8) disposed on the outer surface of the first side portions 141, and second portions 170-2 (see FIG. 8) disposed on the outer surface of the second side portions 142.

For example, each of the first portions 170-1 of the sensing coil 170 may be linear, and each of the second portions 170-2 may be curved.

The second portions 170-2 of the sensing coil 170 may be located outside the support member 220. For example, each of the second portions 170-2 of the sensing coil 170 may be located outside a corresponding one of the support members 220-1 to 220-4.

The distance from the center of the housing 140 to each of the support members 220-1 to 220-4 is less than the distance from the center of the housing 140 to each of the second portions 170-2 of the sensing coil 170. For example, the distance from the center of the housing 140 to any one of the support members (e.g., 220-1) may be less than the distance from the center of the housing to the second portion 170-2 of the sensing coil 170, which corresponds to the support member (e.g., 220-1).

The sensing coil 170 does not overlap the frame connection portion 153 of each of the first to fourth upper elastic members 150-1 to 150-4 in the first direction. Due thereto, assuming that the number of turns is the same, the length of the sensing coil 170 may be increased.

At least a portion of the outer frame 152 of the upper elastic member 150 may be disposed on the second area S2 of the upper surface 401 of the housing 140, which is exposed by the protruding portion 144. Due thereto, the sensing coil 170 may overlap the outer frame 152 of each of the first to fourth upper elastic members 150-1 to 150-4 in the first direction.

For example, at least a portion of the first coupling portion 510 of the outer frame 152 of each of the first to fourth upper elastic members 150-1 to 150-4 may overlap the sensing coil 170 in the first direction.

For example, the portion 901, in which the first coupling portion 510 and the frame connection portion 153 of the first to fourth upper elastic members 150-1 to 150-4 are connected to each other, may overlap the sensing coil 170 in the first direction.

Since the upper elastic member 150 may be disposed on the upper surface of the housing 140 so that the outer frame 152 thereof overlaps the sensing coil 170 in the first direction, there is no spatial limitation when the upper elastic member 150 is disposed on the housing 140, and the upper elastic member 150 may be disposed with increased freedom.

Since the sensing coil 170 is directly wound around the side portion of the housing 140 so that the second portion 170-2 thereof is located outside the support members 220-1 to 220-4, according to the embodiment, the sensing coil 170 may be wound on the upper end of the outer surface of the first and second side portions 141 and 142 of the housing 140, and the length of the sensing coil 170 that is wound once around the housing 140 may increase. The number of turns of the housing 140 for realizing the sensing coil 170 having a predetermined resistance value may decrease as the length of the sensing coil 170 that is wound once is increased. Then, as the number of turns of the sensing coil 170 decreases, the area of the housing 140 required for the sensing coil 170 may decrease and the area for disposing the magnet 130 may increase, which may allow an increase in the size of the magnet that may be mounted in the housing 140.

For example, the resistance value of the sensing coil may be influenced by a change in temperature, and sensing current may change due to the change in the resistance value of the sensing coil. Since the influence of the sensing current due to such a change in temperature may cause malfunction of AF driving, temperature compensation is required. By making the resistance of the sensing coil equal to or greater than a predetermined resistance value (e.g., 3052), such temperature compensation may be easily performed. The embodiment may realize a sufficient resistance value for facilitating temperature compensation with a small number of turns.

As a result, by securing the space in the housing 140 in which the magnet 130 having a larger size may be disposed, the embodiment may increase the electromagnetic force due to the interaction with the magnet 130.

Figure 11:
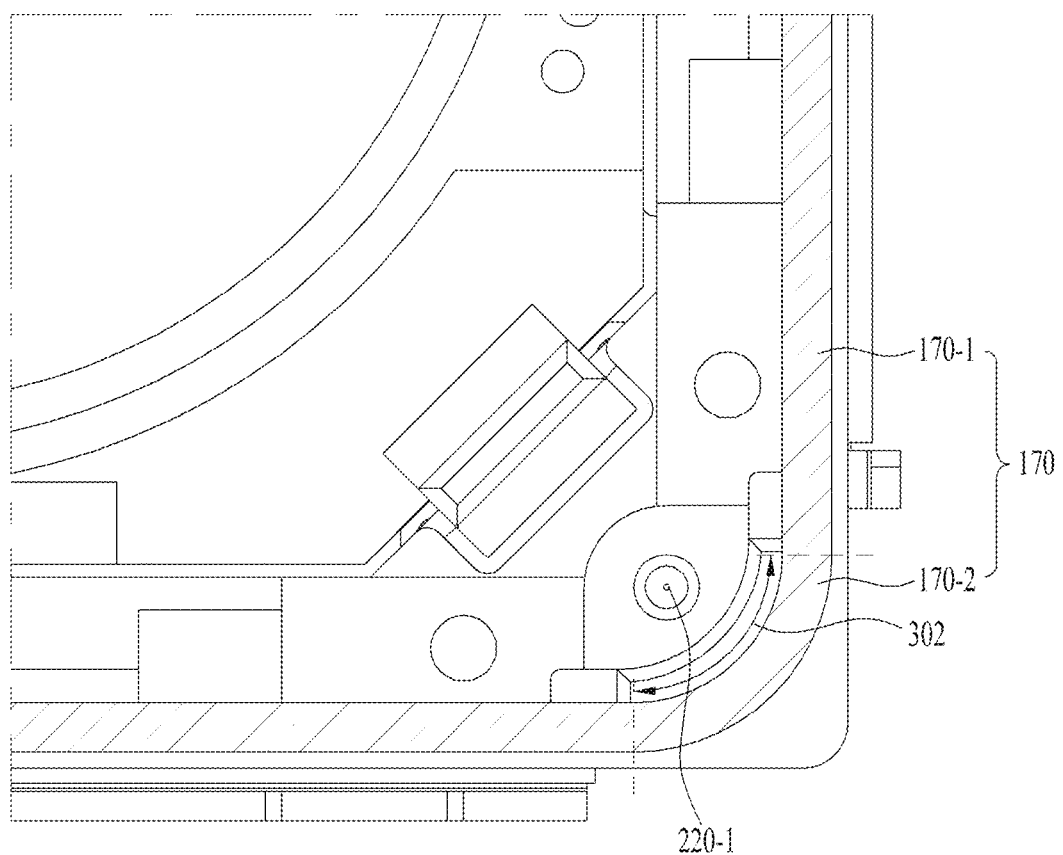
FIG. 11 is a top view illustrating the arrangement of a sensing coil illustrated in FIG. 8.

FIG. 11 is a top view illustrating the arrangement of the sensing coil 170 illustrated in FIG. 8.

Referring to FIG. 11, since the sensing coil 170 is wound around the housing 140 so that a curved portion 302 of the sensing coil 170 is located outside the support member 220-1, it is possible to increase the length of one turn of the sensing coil 170 compared with the case in which the curved portion of the sensing coil 170 is located inside the support member 220-1.

As described above, in the embodiment, since the sensing coil 170 is directly wound on the outer surfaces of the first and second side portions 141 and 142 of the housing 140, deterioration in bonding reliability between the sensing coil 170 and the housing 140 or between the sensing coil 170 and the upper elastic member 150 may be inhibited.

In addition, since the sensing coil 170 is disposed below the upper elastic member 150 and spaced apart from the upper elastic member 150, in the embodiment, the upper elastic member 150 is disposed on the upper end of the housing 140 without any spatial limitation.

In addition, since the sensing coil 170 is disposed outside the support member 220, it is possible to maximize the length of the outermost periphery of the sensing coil 170, to realize the sensing coil 170 having a predetermined resistance with a small number of turns, and to increase the size of the magnet 130, which may be disposed on the housing 140, so as to increase the electromagnetic force for AF or OIS driving.

Figure 12:
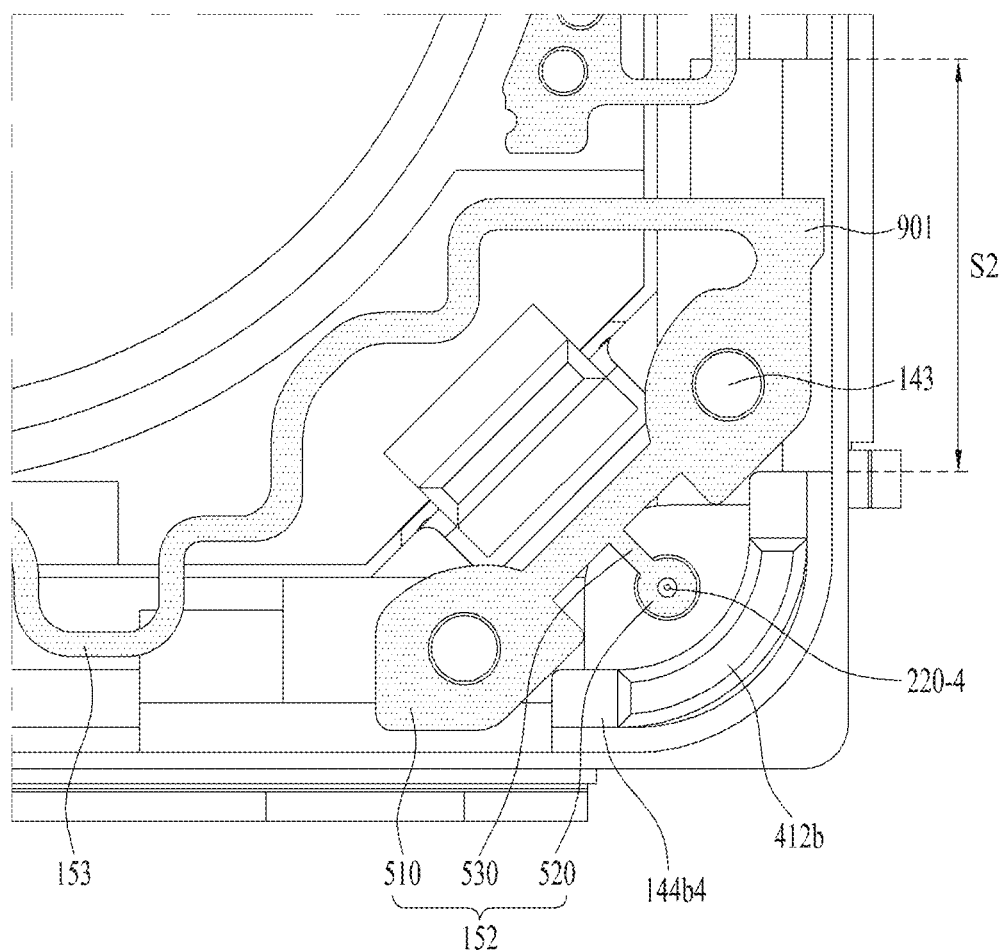
FIG. 12 illustrates a top view of the portion indicated by the dotted line of FIG. 8.
Figure 13:
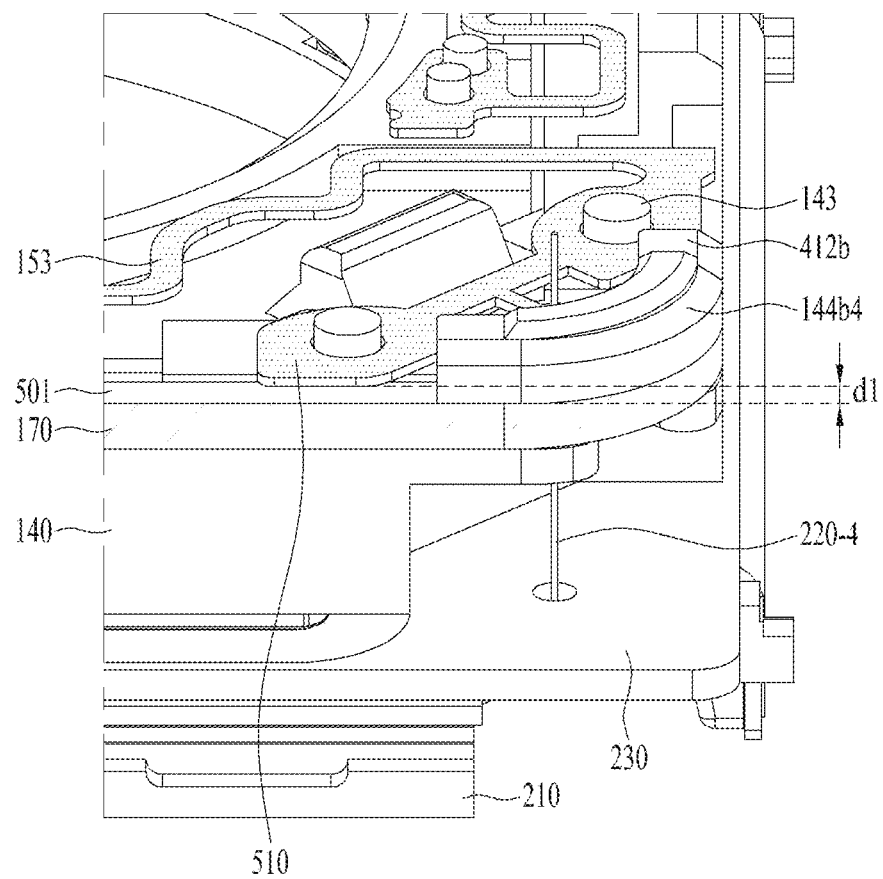
FIG. 13 illustrates a side perspective view of the portion indicated by the dotted line of FIG. 8.

FIG. 12 illustrates a top view of the portion II indicated by the dotted line of FIG. 8, and FIG. 13 illustrates a side perspective view of the portion II indicated by the dotted line of FIG. 8.

In order to secure the linearity of the inductive voltage induced in the sensing coil 170 by the current of the first coil 120, it may be necessary to set the distance between the first coil 120 and the sensing coil 170 in the first direction to be equal to or greater than a predetermined distance.

The sensing coil 170 according to the embodiment is disposed on the upper end of the side portions 141 and 142 of the housing 140 adjacent to the upper surface 401 of the housing 140, so that the distance between the first coil 120 and the sensing coil 170 may be equal to or greater than a predetermined distance in the first direction.

When the sensing coil 170 is disposed on the upper end of the side portions 141 and 142 of the housing 140, the sensing coil 170 may be separated upward from the housing 140. The protruding portion 144 of the housing 140 of the embodiment may serve to inhibit the sensing coil 170 disposed on the upper end of the side portion of the housing 140 from being separated upward.

Unlike the embodiment, when the protruding portion 144 of the housing 140 is disposed on the front edge of the upper surface of the housing 140, which corresponds to or is aligned with the sensing coil 140 disposed on the housing 140, the space in which the upper elastic member 150 is disposed on the upper surface of the elastic member 140 may be limited. Thus, the embodiment may overcome a spatial limitation pertaining to the installation of the upper elastic member 150 by allowing the second area S2 of the upper surface 401 of the housing 140 to be exposed and allowing the outer frame 152 of the upper elastic member 150 to be disposed on the second area S2 of the upper surface 401 of the housing 140 through the provision of the protruding portion 144.

A portion 501 of the side portion of the housing 140 may be disposed between the upper elastic member 150 and the sensing coil 170 in order to inhibit interference or contact between the upper elastic member 150 and the sensing coil 170.

Here, a distance d1 between the lower surface of the upper elastic member 150 and the upper surface of the sensing coil 170 may range from 0.05 mm to 1 mm. When the distance d1 is less than 0.05 mm, interference or contact may occur between the upper elastic member 150 and the sensing coil 170. For example, the distance d1 between the lower surface of the upper elastic member 150 and the upper surface of the sensing coil 170 may range from 0.05 mm to 0.1 mm. When the distance d1 exceeds 1 mm, the distance between the first coil 120 and the sensing coil 170 in the first direction may not be sufficiently secured, which may make it impossible to secure the linearity of the inductive voltage of the sensing coil 170.

Figure 14:
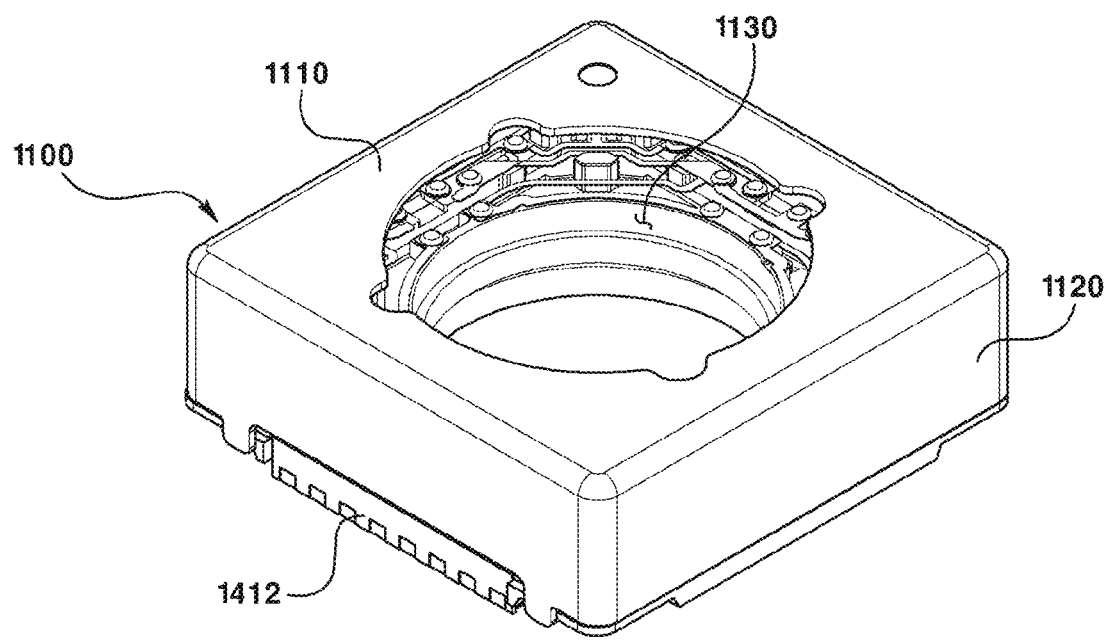
FIG. 14 is a perspective view of a lens driving device according to another embodiment.
Figure 15:
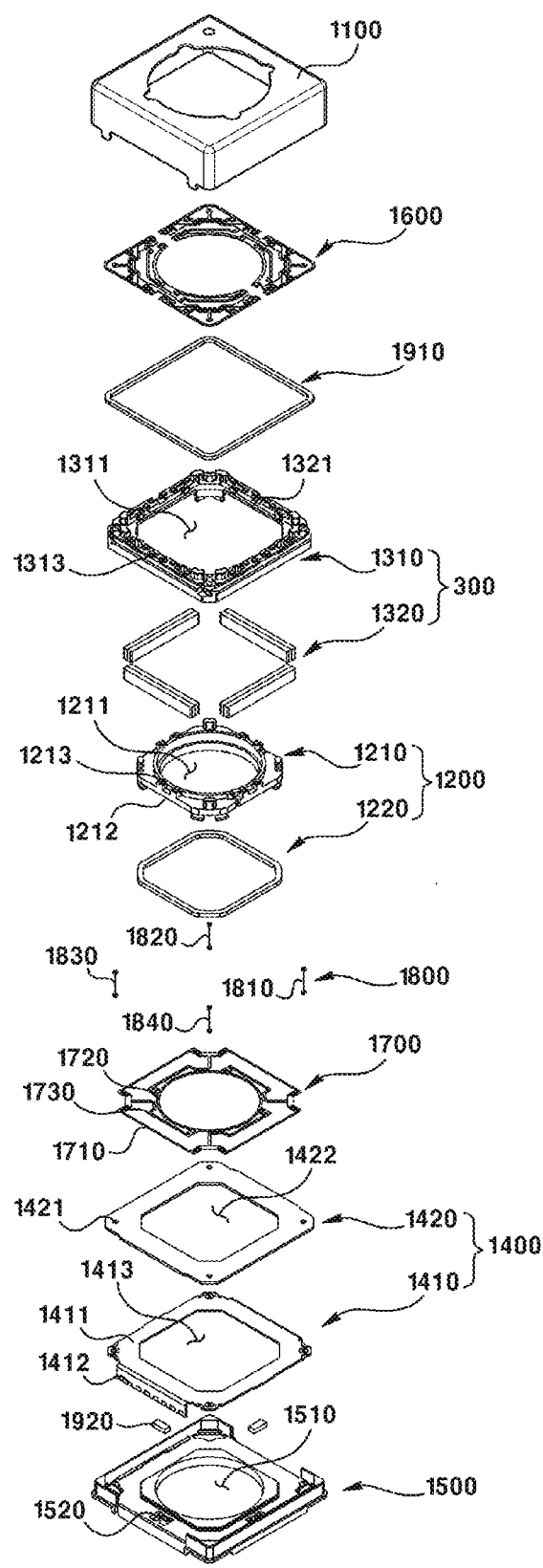
FIG. 15 is an exploded perspective view of the lens driving device illustrated in FIG. 14.
Figure 16:
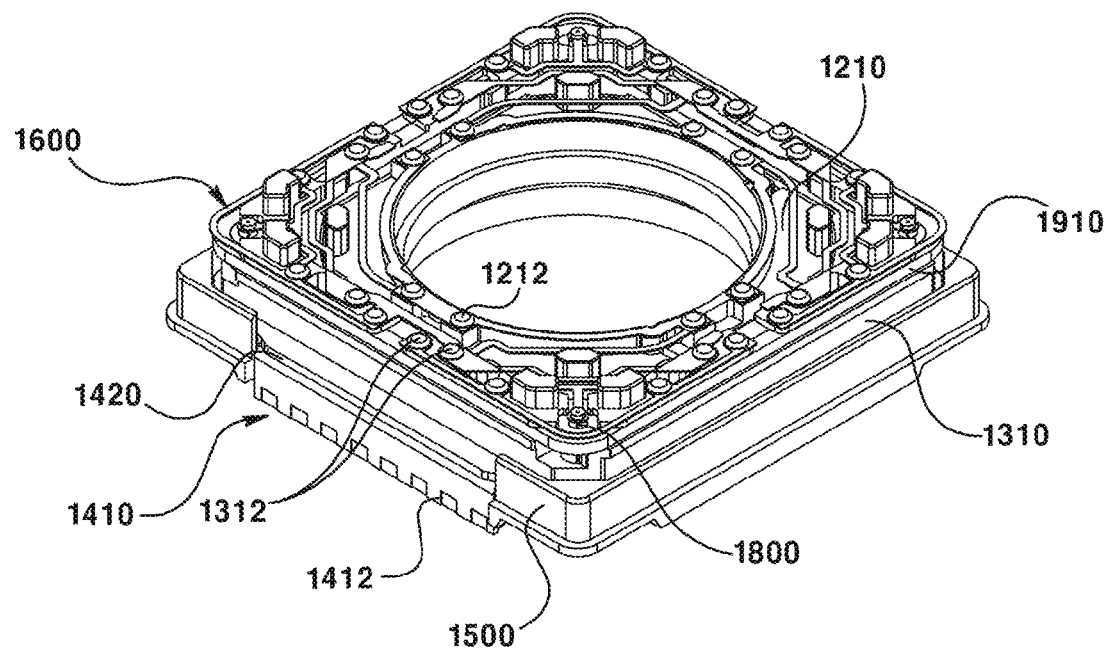
FIG. 16 is a perspective view of the lens driving device of FIG. 14 excluding a cover member.
Figure 17:
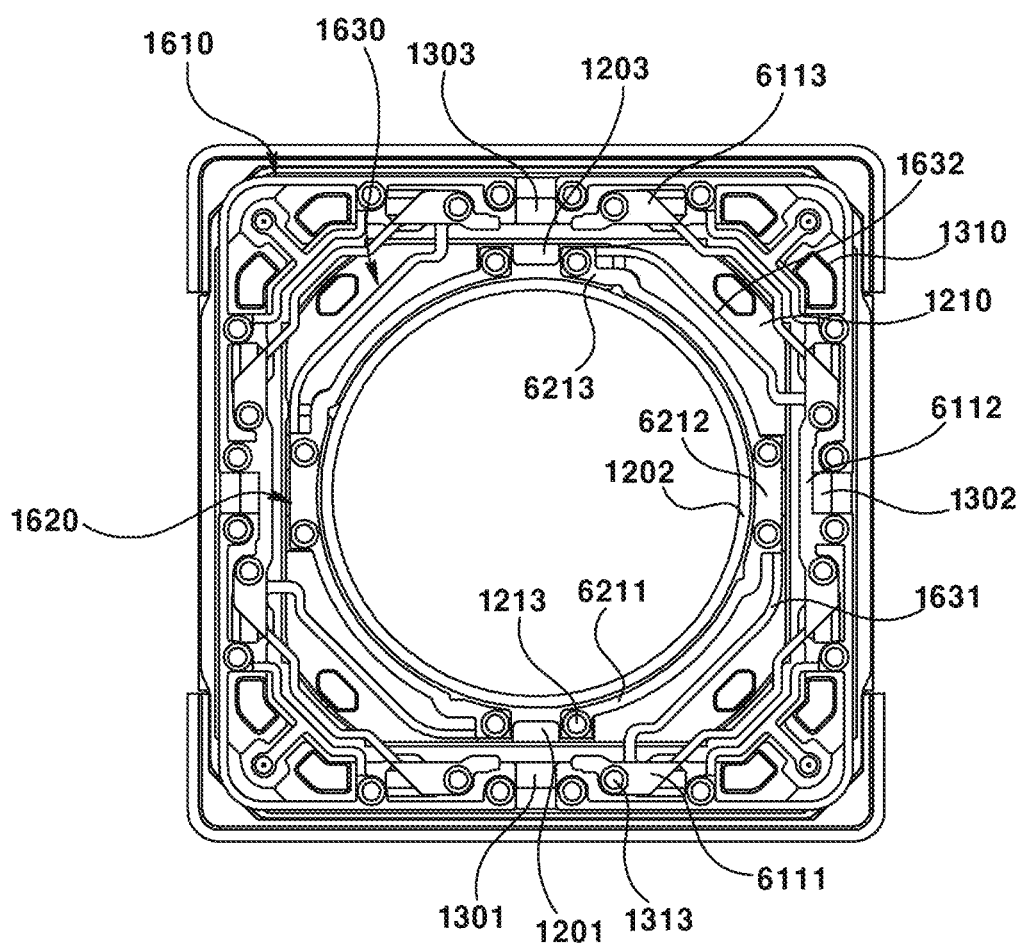
FIG. 17 is a plan view of FIG. 16.

FIG. 14 is a perspective view of a lens driving device according to another embodiment, FIG. 15 is an exploded perspective view of the lens driving device illustrated in FIG. 14, FIG. 16 is a perspective view of the lens driving device of FIG. 14 excluding a cover member, FIG. 17 is a plan view of FIG. 16, FIG. 18 is a perspective view illustrating a portion of the lens driving device of FIG. 16, FIG. 19 is a perspective view illustrating another portion of the lens driving device of FIG. 16, and FIG. 20 is a plan view illustrating an upper elastic member of FIG. 17.

Hereinafter, the direction toward the center of the lens driving device will be referred to "inside", and the direction away from the center of the lens driving device will be referred to as "outside".

Hereinafter, any one of an AF coil unit 1220, a drive magnet unit 1320, and an OIS coil unit 1420 may be referred to as a "first drive unit", another one thereof may be referred to as a "second drive unit", and the remaining one thereof may be referred to as a "third drive unit". Meanwhile, the embodiment will be described on the assumption that the AF coil unit 1220 is located on the bobbin 1210, the drive magnet unit 1320 is located on a housing 1310, and the OIS coil unit 1420 is located on a base 1500, but the AF coil unit 1220, the drive magnet unit 1320, and the OIS coil unit 1420 may be arranged with their positions interchanged. Moreover, at least one of the AF coil unit 1220 and the OIS coil unit 1420 may be replaced with an additional magnet unit. That is, the first to third drive units may be provided in any other configuration as long as they are capable of selectively undergoing electromagnetic interaction with each other.

Hereinafter, any one of the AF coil unit 1220, the OIS coil unit 1420, and a sensing coil unit 1910 may be referred to as a "first coil unit", another one thereof may be referred to as a "second coil unit", and the remaining one thereof may be referred to as a "third coil unit".

Hereinafter, any one of the upper elastic member 1600, a lower elastic member 1700, and a lateral support member 1800 may be referred to as a "first support member", another one may be referred to as a "second support member", and the other one may be referred to as a "third support member".

Referring to FIGS. 14 to 20, the lens driving device may include a cover member 1100, a first mover 1200, a second mover 1300, a stator 1400, the base 1500, the upper elastic member 1600, the lower elastic member 1700, the lateral support member 1800, and a sensor unit (not illustrated). However, in the lens driving device according to the embodiment, at least one of the cover member 1100, the first mover 1200, the second mover 1300, the stator 1400, the base 1500, the upper elastic member 1600, the lower elastic member 1700, the lateral support member 1800, and the sensor unit may be omitted. In particular, the sensor unit is used for an autofocus feedback function and/or a hand-tremor compensation feedback function and may be omitted.

The cover member 1100 may accommodate the housing 1310 and the bobbin 1210 in the inner space thereof. The cover member 1100 may be coupled to the base 1500. The cover member 1100 may form the external appearance of the lens driving device. The cover member 1100 may be in the form of a hexahedron having an open bottom. However, the disclosure is not limited thereto.

The cover member 1100 may be formed of a metal material as an example. In more detail, the cover member 1100 may be formed of a metal plate. In this case, the cover member 1100 may block electro magnetic interference (EMI). Because of this feature of the cover member 1100, the cover member 1100 may be referred to as an "EMI shield can". The cover member 1100 may inhibit electromagnetic waves generated outside the lens driving device from being introduced into the cover member 1100. In addition, the cover member 1100 may inhibit the electromagnetic waves generated inside the cover member 1100 from being emitted to the outside of the cover member 1100. However, the material of the cover member 1100 is not limited thereto.

The cover member 1100 may include an upper plate 1110 and a side plate 1120. The cover member 1100 may include the side plate 1120 having a lower end coupled to the base 1500. The cover member 1100 may include the upper plate 1110 located at the upper side of the housing 1310. The lower end of the side plate 1120 of the cover member 1100 may be mounted on the base 1500. The cover member 1100 may be mounted on the base 1500 in such a manner that the inner surface of the cover member comes into close contact with a portion or all of the side surface of the base 1500. The first mover 1200, the second mover 1300, the stator 1400 and the support members 1600, 1700 and 1800 may be located in the inner space defined by the cover member 1100 and the base 1500. With such a structure, the cover member 1100 may protect inner constituent elements from external shocks and may inhibit the introduction of external contaminants. However, the disclosure is not limited thereto, and the lower end of the side plate 1120 of the cover member 1100 may be directly coupled to a printed circuit board located below the base 1500.

The cover member 1100 may include an opening 1130 formed in the upper plate 1110 to expose a lens module. The opening 1130 may be provided in a shape corresponding to that of the lens module. The size of the opening 1130 may be greater than the diameter of the lens module so that the lens module may be assembled through the opening 1130. Meanwhile, the light introduced through the opening 1130 may pass through the lens module. Here, the light having passed through the lens module may be acquired as an image in an image sensor.

The first mover 1200 may include the bobbin 1210 and the AF coil unit 1220. The first mover 1200 may include the bobbin 1210 coupled to the lens module. The first mover 1200 may include the AF coil unit 1220, which is located on the bobbin 1210 and is configured to move via electromagnetic interaction with the drive magnet unit 1320.

The bobbin 1210 may be accommodated in the inner space in the cover member 1100. The bobbin 1210 may be coupled to the lens module. More specifically, the outer circumferential surface of the lens module may be coupled to the inner circumferential surface of the bobbin 1210. The AF coil unit 1220 may be located on the bobbin 1210. The AF coil unit 1220 may be coupled to the bobbin 1210. The upper elastic member 1600 may be coupled to the upper portion of the bobbin 1210. The bobbin 1210 may be located inside the housing 1310. The bobbin 1210 may be moved relative to the housing 1310 in the direction of the optical axis.

The bobbin 1210 may include first to third side portions 1201, 1202 and 1203, which are consecutively arranged. The bobbin 1210 may include the first side portion 1201, which faces a first side surface portion 1301. The bobbin 1210 may include the second side portion 1202, which faces a second side surface portion 1302. The bobbin 1210 may include the third side portion 1203, which faces a third side surface portion 1303.

The bobbin 1210 may include a lens accommodating portion 1211, a first drive unit coupling portion 1212, an upper coupling portion 1213, and a lower coupling portion (not illustrated).

The bobbin 1210 may include therein the lens accommodating portion 1211 having open upper and lower sides. The bobbin 1210 may include the lens accommodating portion 1211 formed therein. The lens accommodating portion 1211 may be coupled to the lens module. Threads having a shape corresponding to threads formed on the outer circumferential surface of the lens module may be formed on the inner circumferential surface of the lens accommodating portion 1211. That is, the lens accommodation portion 211 may be screwed to the lens module. An adhesive may be interposed between the lens module and the bobbin 1210. Here, the adhesive may be epoxy that is cured by ultraviolet (UV) light or heat. That is, the lens module and bobbin 1210 may be bonded to each other by an UV-curable epoxy and/or a thermally curable epoxy.

The bobbin 1210 may include a first drive unit coupling portion 1212 on which the AF coil unit 1220 is disposed. The first drive unit coupling portion 1212 may be formed integrally with the outer surface of the bobbin 1210. In addition, a plurality of first drive unit coupling portions 1212 may be consecutively formed along the outer surface of the bobbin 1210, or may be spaced apart from each other at a predetermined interval. For example, the first drive unit coupling portion 1212 may be formed such that a portion of the outer surface of the bobbin 1210 is recessed so as to correspond to the shape of the AF coil unit 1220. Here, the AF coil unit 1220 may be directly wound on the first drive unit coupling portion 1212. As a modification, the first drive unit coupling portion 1212 may be formed such that the upper side or the lower side thereof is open. Here, the AF coil unit 1220 may be wound in advance and then may be inserted into and coupled to the first drive unit coupling portion 1212 through the open side.

The bobbin 1210 may include the upper coupling portion 1213 coupled to the upper elastic member 1600. The upper coupling portion 1213 may be coupled to the inner frame 1620 of the upper elastic member 1600. In one example, a protrusion (not illustrated) of the upper coupling portion 1213 may be inserted into and coupled to a groove or hole (not illustrated) in the inner frame 1620 of the upper elastic member 1600. Here, the protrusion of the upper coupling portion 1213 may be thermally fused in the state of being inserted into the hole in the inner frame 1620 so as to fix the upper elastic member 1600.

The bobbin 1210 may include the lower coupling portion coupled to the lower elastic member 1700. The lower coupling portion may be coupled to an inner frame 1720 of the lower support member 1700. In an example, a protrusion (not illustrated) of the lower coupling portion may be inserted into and coupled to a groove or a hole (not illustrated) in the inner frame 1720 of the lower support member 1700. Here, the protrusion of the lower coupling portion may be thermally fused in the state of being inserted into the hole in the inner frame 720 so as to fix the lower support member 1700.

The AF coil unit 1220 may be located on the bobbin 1210. The AF coil unit 1220 may be coupled to the bobbin 1210. The AF coil unit 1220 may be guided by the first drive unit coupling portion 1212 and wound on the outer surface of the bobbin 1210. In addition, in another embodiment, the AF coil unit 1220 may include four independent coils so that two neighboring coils are disposed on the outer surface of the bobbin 1210 at an angular distance of 90°. The AF coil unit 1220 may face the drive magnet unit 1320. The AF coil unit 1220 may be disposed so as to be capable of electromagnetic interacting with the drive magnet unit 1320. The AF coil unit 1220 may move the bobbin 1210 relative to the housing 1310 via the electromagnetic interaction with the drive magnet unit 1320.

The AF coil unit 1220 may include a pair of lead wires 1221 for the supply of a voltage. Here, the pair of lead wires 1221 of the AF coil unit 1220 may be connected respectively to the first inner portion 1621 and the second inner portion 1622. That is, the AF coil unit 1220 may receive a voltage through the upper elastic member 1600. With such a structure, when a voltage is supplied to the AF coil unit 1220, an electromagnetic field may be formed around the AF coil unit 1220. The lead wires 1221 of the AF coil unit 1220 may be coupled to the first inner portion 1621 and the second inner portion 1622. Thereby, the AF coil unit 1220 may be in electrical conduction with the first outer portion 1611 and the third outer portion 1613. In this case, a voltage may be supplied from a substrate 1410 to the AF coil unit 1220 through a first support portion 1810 coupled to the first outer portion 1611 and a third support portion 1830 coupled to the third outer portion 1613. More specifically, the current supplied to a terminal 1412 of the substrate 1410 may be supplied to the AF coil unit 1220 by sequentially passing through the first support portion 1810, the first outer portion 1611, the first and second connection portions 1631 and 1632, and the first inner portion 1621. In addition, current supplied to the AF coil unit 1220 may be transferred to the terminal 1412 of the substrate 1410 through the second inner portion 1622, the third and fourth connection portions 1633 and 1634, the third outer portion 1613, and the third support portion 1830.

The lead wire 1221 of the AF coil unit 1220 may be coupled to the inner frame 1620 via a solder element 1222, as illustrated in FIG. 19. However, the coupling between the AF coil unit 1220 and the inner frame 1620 is not limited to soldering, and any other coupling method may be applied as long as it provides electrically conductive fixing.

The second mover 1300 may be moved for hand-tremor compensation. The second mover 1300 may be located outside the first mover 1200 so as to face the first mover 1200. The second mover 1300 may move the first mover 1200, or may be moved together with the first mover 1200. The second mover 1300 may be movably supported by the stator 1400 and/or the base 1500 located thereunder. The second mover 1300 may be located in the inner space in the cover member 1100.

The second mover 1300 may include the housing 1310 and the drive magnet unit 1320. The second mover 1300 may include the housing 1310 located outside the bobbin 1210. In addition, the second mover 1300 may include the drive magnet unit 1320, which is located so as to face the AF coil unit 1220 and is fixed to the housing 1310.

At least a portion of the housing 1310 may be formed to have a shape corresponding to that of the inner surface of the cover member 1100. In particular, the outer surface of the housing 1310 may be formed to have a shape corresponding to that of the inner surface of the side plate 1120 of the cover member 1100. The housing 1310 may take the form of a hexahedron including four sides as an example. However, the housing 1310 may have any other shape as long as it may be disposed inside the cover member 1100. The housing 1310 may be formed of an insulating material and may be formed as an injection molded article in consideration of productivity.

The housing 1310 may be located outside the bobbin 1210. The housing 1310 may be provided with the drive magnet unit 1320. The housing 1310 may be located above the base 1500. The housing 1310 may be moved for OIS driving and may be spaced apart from the cover member 1100 by a certain distance. However, in an AF model, the housing 1310 may be fixed on the base 1500. Alternatively, in the AF model, the housing 1310 may be omitted and the drive magnet unit 1320 may be fixed to the cover member 1100. The upper support member 1600 may be coupled to the upper portion of the housing 1310. The housing 1310 may be spaced apart from the bobbin 1210. However, in this case, a portion of the bobbin 1210 and a portion of the housing 1310 may be in contact with each other as the bobbin 1210 moves.

The housing 1310 may include the first to third side surface portions 1301, 1302 and 1303, which are consecutively arranged. The housing 1310 may include the first side surface portion 1301. The housing 1310 may include the second side surface portion 1302 adjacent to the first side surface portion 1301. The housing 1310 may include the third side surface portion 1303 adjacent to the second side surface 1302.

The housing 1310 may include an inner space 1311, a second drive unit coupling portion 1312, an upper coupling portion 1313, and a lower coupling portion (not illustrated).

The upper and lower sides of the housing 1310 may be open to accommodate the first mover 1200 so as to be movable in the vertical direction. The housing 1310 may include the inner space 1311 having open upper and lower sides. The bobbin 1210 may be movably disposed in the inner space 1311. That is, the inner space 1311 may have a shape corresponding to that of the bobbin 1210. In addition, the inner circumferential surface of the housing 1310, which forms the inner space 1311, may be spaced apart from the outer circumferential surface of the bobbin 1210.

The housing 1310 may include the second drive unit coupling portion 1312, which is formed on the side surface of the housing to have a shape corresponding to that of the drive magnet unit 1320 so as to accommodate the drive magnet 1320. The second drive unit coupling portion 1312 may accommodate and fix the drive magnet unit 1320. The drive magnet unit 1320 may be fixed to the second drive unit coupling portion 1312 using an adhesive (not illustrated). Meanwhile, the second drive unit coupling portion 1312 may be located on the inner circumferential surface of the housing 1310. This case is advantageous from the aspect of electromagnetic interaction of the second drive unit coupling portion with the AF coil unit 1220 located inside the drive magnet unit 1320. In addition, the second drive unit coupling portion 1312 may have an open bottom shape as an example. In this case, there is an advantage from the aspect of electromagnetic interaction between the OIS coil unit 1420 located below the drive magnet unit 1320 and the drive magnet unit 1320. In an example, four second drive unit coupling portion 1312 may be provided. The drive magnet unit 1320 may be coupled to each of the four second drive unit coupling portions 1312.

The housing 1310 may include the upper coupling portion 1313 coupled to the upper elastic member 1600. The upper coupling portion 1313 may be coupled to the outer frame 1610 of the upper support member 1600. As an example, a protrusion of the upper coupling portion 1313 may be inserted into and coupled to a groove or a hole (not illustrated) in the outer frame 1610 of the upper elastic member 1600. Here, the protrusion of the upper coupling portion 1313 is thermally fused in the state of being inserted into the hole in the outer frame 1610 so as to fix the upper supporting member 1600.

The housing 1310 may include the lower coupling portion coupled to the lower elastic member 1700. The lower coupling portion may be coupled to an outer frame 1710 of the lower elastic member 1700. As an example, a protrusion of the lower coupling portion may be inserted into and coupled to a groove or a hole (not illustrated) in the outer frame 1710 of the lower elastic member 1700. Here, the protrusion of the lower coupling portion may be thermally fused in the state of being inserted into the hole in the outer frame 1710 so as to fix the lower elastic member 1700.

The drive magnet unit 1320 may be accommodated in the inner space in the cover member 1100. The drive magnet unit 1320 may face the AF coil unit 1220. The drive magnet unit 1320 may move the AF coil unit 1220 via electromagnetic interaction with the AF coil unit 1220. The drive magnet unit 1320 may be located in the housing 1310. The drive magnet unit 1320 may be fixed to the second drive unit coupling portion 1312 of the housing 1310. The drive magnet unit 1320 may be disposed in the housing 1310 such that four magnets are provided independently of each other and two neighboring magnets form an angle of 90 degrees. That is, the drive magnet unit 1320 may efficiently use the internal volume via the magnets, which are equidistantly mounted on four side surfaces of the housing 1310. In addition, the drive magnet unit 1320 may be bonded to the housing 1310 using an adhesive. However, the disclosure is not limited thereto.

The stator 1400 may include the substrate 1410 and the OIS coil unit 1420 as an example. The stator 1400 may include the substrate 1410 located between the OIS coil unit 1420 and the base 1500. In addition, the stator 1400 may include the OIS coil unit 1420, which faces the drive magnet 1320.

The substrate 1410 may be located below the housing 1310. The OIS coil unit 1420 may be located on the substrate 1410. The OIS coil unit 1420 may be coupled to the substrate 1410. The substrate 1410 may include a flexible printed circuit board (FPCB), which is a flexible printed circuit board. The substrate 1410 may be located between the base 1500 and the housing 1310. The substrate 1410 may be located between the OIS coil unit 1420 and the base 1500. The substrate 1410 may supply a voltage to the OIS coil unit 1420. The substrate 1410 may supply a voltage to the AF coil unit 1220. As an example, the substrate 1410 may supply a voltage to the AF coil unit 1220 through the lateral support member 1800 and the upper elastic member 1600. In addition, the substrate 1410 may be in electrical conduction with the sensing coil unit 1910 through the lateral support member 1800 and the upper elastic member 1600.

The substrate 1410 may include a body portion 1411, a terminal portion 1412, and a through-hole 1413 as an example. The substrate 1410 may include the terminal portion 1412, which extends from one side of the body portion 1411 and is bent downward. The substrate 1410 may include the through-hole 1413 through which light having passed through the lens module passes.

The OIS coil unit 1420 may face the drive magnet unit 1320. The OIS coil unit 1420 may move the drive magnet unit 1320 via electromagnetic interaction. The OIS coil unit 1420 may be located on the substrate 1410. The OIS coil unit 1420 may be located between the base 1500 and the housing 1310. The OIS coil unit 1420 may face the drive magnet unit 1320. When a voltage is applied to the OIS coil unit 1420, the drive magnet unit 1320 and the housing 1310, to which the drive magnet unit 1320 is fixed, may integrally move via the interaction of the OIS coil unit 1420 and the drive magnet unit 1320.

The OIS coil unit 1420 may be formed of a fine pattern (FP) coil mounted on the substrate 1410. In this case, the OIS coil unit may be effective in terms of downsizing of the lens driving device (lowering the height in the z-axis direction, which is the optical-axis direction).

The OIS coil unit 1420 may be formed so as to minimize interference with the OIS sensor unit 1920 located thereunder as an example. The OIS coil unit 1420 may be located so as not to overlap the OIS sensor unit 1920 in the vertical direction.

The OIS coil unit 1420 may include a coupling portion 1421 coupled to the lateral support member 1800. The coupling portion 1421 of the OIS coil unit 1420 may be coupled to the lateral support member 1800. For example, the coupling portion 1421 may be formed as a through-hole, and the lateral support member 1800 formed of a wire may pass through the coupling portion 1421. A portion of the lateral support member 1800, which has passed through the coupling portion 1421, may be coupled to the OIS coil unit 1420 through soldering.

The OIS coil unit 1420 may have a through-hole 1422 through which the light of the lens module passes. The through-hole 1422 may have a diameter corresponding to the diameter of the lens module. The through-hole 1422 in the OIS coil unit 1420 may have a diameter corresponding to that of the through-hole 1413 in the substrate 1410. The through-hole 1422 in the OIS coil unit 1420 may have a diameter corresponding to that of a through-hole 1510 in the base 1500. The through-hole 1422 may have a circular shape as an example. However, the disclosure is not limited thereto.

The base 1500 may be disposed on a printed circuit board. The base 1500 may be fixed to the printed circuit board using an adhesive for active alignment. The base 1500 may be located below the bobbin 1210. The base 1500 may be located below the housing 1310. The base 1500 may support the second mover 1300. The printed circuit board may be located below the base 1500. The base 1500 may perform a sensor holder function of protecting an image sensor mounted on the printed circuit board.

The base 1500 may include the through-hole 1510, a foreign substance collector (not illustrated), and a sensor mounting portion 1530. The base 1500 may include an erroneous insertion inhibiting portion (not illustrated).

The base 1500 may include the through-hole 1510 formed at a position corresponding to the lens accommodating portion 1211 of the bobbin 1210. Meanwhile, an infrared ray filter may be coupled to the through-hole 1510 in the base 1500. However, an infrared filter may be coupled to a separate sensor holder disposed under the base 1500.

The base 1500 may include the foreign substance collector, which collects a foreign substance introduced into the cover member 1100. The foreign substance collector may be located on the upper surface of the base 1500 and may include an adhesive material to collect a foreign substance in the inner space defined by the cover member 1100 and the base 1500.

The base 1500 may include the sensor mounting portion 1530 to which the OIS sensor unit 1920 is coupled. That is, the OIS sensor unit 1920 may be mounted on the sensor mounting portion 1530. Here, the OIS sensor unit 1920 may sense the magnetic field of the drive magnet unit 1320 coupled to the housing 1310, thereby detecting horizontal movement or tilting of the housing 1310. Two sensor mounting portions 1530 may be provided as an example. Each of the two sensor mounting portions 1530 may be provided with the OIS sensor unit 1920. In this case, the OIS sensor unit 1920 may include a first axis sensor and a second axis sensor, which are arranged to sense both the x-axis and y-axis movements of the housing 1310.

The support members 1600, 1700 and 1800 may interconnect any two or more of the first mover 1200, the second mover 1300, the stator 1400, and the base 1500. The support members 1600, 1700 and 1800 elastically interconnect any two or more of the first mover 1200, the second mover 1300, the stator 1400, and the base 1500 so as to support the respective elements to enable a relative movement therebetween. The support members 1600, 1700 and 1800 may be formed so that at least a portion thereof has elasticity. In this case, the support members 1600, 1700 and 1800 may be referred to as "elastic members" or "springs".

The support members 1600, 1700 and 1800 may include, for example, the upper elastic member 1600, the lower elastic member 1700, and the lateral support member 1800. Here, the upper elastic member 1600 or the lower elastic member 1700 may be referred to as "an upper elastic member or a lower elastic member", an "autofocus spring", an "AF elastic member", or the like. In addition, the lateral support member 800 may be referred to as a "support member", a "hand-tremor compensation spring" or an "OIS elastic member".

The upper elastic member 1600 may be coupled to the housing 1310 and the bobbin 1210.

The upper elastic member 1600 may be coupled to the upper portion of the housing 1310 and the upper portion of the bobbin 1210. The inner frame 1620 of the upper elastic member 1600 may be coupled to the upper coupling portion 1213 of the bobbin 1210, and the outer frame 1610 of the upper elastic member 1600 may be coupled to the upper coupling portion 1313 of the housing 1310.

The upper elastic member 1600 may include the outer frame 1610, the inner frame 1620, and the frame connection portion 1630. The upper elastic member 1600 may include the outer frame 1610 coupled to the housing 1310. The upper support member 1600 may include the inner frame 1620 coupled to the bobbin 1210. The upper elastic member 1600 may include the frame connection portion 1630 connecting the outer frame 1610 and the inner frame 1620 to each other.

For example, the inner frame 1620 may be referred to as an "inner frame", the outer frame 1610 may be referred to as an "outer frame", and the frame connection portion 1630 may be referred to as a "frame connection portion".

The upper elastic member 1600 may include a first support unit and a second support unit. Here, the first support unit may be coupled to both the housing 1310 and the bobbin 1210, and the second support unit may not be coupled to the bobbin 1210, but may be coupled only to the housing 1310. That is, the first support unit may include, for example, the first outer portion 1611, the first inner portion 1621, and the first connection portion 1631. In addition, the second support unit may include the second outer portion 1612.

The outer frame 1610 may include the first outer portion 1611 and the second outer portion 1612, which are spaced apart from each other. The outer frame 1610 may further include the third outer portion 1613, which is spaced apart from the first and second outer portions 1611 and 1612, and the fourth outer portion 1614, which is spaced apart from the first to third outer portions 1613. The outer frame 1610 may include the first to fourth outer portions 1611, 1612, 1613 and 614, which are spaced apart from each other.

That is, the outer frame 1610 may be formed in a structure that is divided into a total of four parts. Here, the first and third outer portions 1611 and 1613 may be used as conductive lines for the AF coil unit 1220, and the second and fourth outer portions 1612 and 1614 may be used as conductive lines for the sensing coil unit 1910. Two outer portions among the first to fourth outer portions 1611, 1612, 1613 and 1614 may be electrically connected to the sensing coil unit 1910, and the remaining two outer portions may be electrically connected to the AF coil unit 1220. The first and third outer portions 1611 and 1613 may be in electrical conduction with the AF coil unit 1220. The second and fourth outer portions 1612 and 1614 may be in electrical conduction with the sensing coil unit 1910.

The first to fourth outer portions 1611, 1612, 1613 and 1614 may be located at corner portions of the housing 1310. The first to fourth outer portions 1611, 1612, 1613 and 1614 may extend along the side surface from the corner portions of the housing 1310.

The first outer portion 1611 may be connected to the inner frame 620 through the frame connection portion 1630. The first outer portion 1611 may be connected to the first inner portion 1621 through the first and second connection portions 1631 and 1632. Here, the first inner portion 1621 may be in electrical conduction with the AF coil unit 1220, and the first outer portion 1611 connected to the first inner portion 1621 may be in electrical conduction with the AF coil unit 1220.

The first outer portion 1611 may include a first outer coupling portion 6111 coupled to the first side surface portion 1301. The first outer portion 1611 may include a second outer coupling portion 6112 coupled to the second side surface portion 1302. The first outer portion 1611 may include a third outer coupling portion 6113 coupled to the third side surface portion 1303.

The second outer portion 1612 may be spaced apart from the frame connection portion 1630. The second outer portion 1612 may be spaced apart from the inner frame 1620. The second outer portion 1612 may be spaced apart from the frame connection portion 1630 and the inner frame 1620. The second outer portion 1612 may not be electrically connected to the frame connection portion 1630 and the inner frame 1620. The second outer portion 1612 may be insulated with respect to the frame connection portion 1630 and the inner frame 1620. Here, the second outer portion 1612 may be in electrical conduction with the sensing coil unit 1910.

The third outer portion 1613 may be connected to the inner frame 1620 through the frame connection portion 1630. The third outer portion 1613 may be connected to the second inner portion 1622 through the third and fourth connection portions 1633 and 1634. Here, the second inner portion 1622 may be in electrical conduction with the AF coil unit 1220 and the third outer portion 1613 connected to the second inner portion 1622 may be in electrical conduction with the AF coil unit 1220.

The fourth outer portion 1614 may be spaced apart from the frame connection portion 1630. The fourth outer portion 1614 may be spaced apart from the inner frame 1620. The fourth outer portion 1614 may be spaced apart from the frame connection portion 1630 and the inner frame 1620. The fourth outer portion 1614 may not be electrically connected to the frame connection portion 1630 and the inner frame 1620. The fourth outer portion 1614 may be insulated with respect to the frame connection portion 1630 and the inner frame 1620. Here, the fourth outer portion 1614 may be in electrical conduction with the sensing coil unit 1910.

The inner frame 1620 may include the first inner portion 1621 and the second inner portion 1622, which are spaced apart from each other. The inner frame 1620 may be formed in a structure that is divided into a total of two parts. Here, the inner frame 1620, which is divided into two parts, may be used to supply a voltage to the AF coil unit 1220. That is, the first inner portion 1621 may be electrically connected to the AF coil unit 1220. The second inner portion 1622 may be electrically connected to the AF coil unit 1220. In other words, the first inner portion 1621 may be coupled to any one of a pair of lead wires 1221 of the AF coil unit 1220. The second inner portion 1622 may be coupled to the other one of the pair of lead wires 1221 of the AF coil unit 1220.

The inner frame 1620 may include the first inner coupling portion 6211 coupled to the first side portion 1201. The inner frame 1620 may include the second inner coupling portion 6212 coupled to the second side portion 1202. The inner frame 1620 may include the third inner coupling portion 6213 coupled to the third side portion 1203.

The inner frame 1620 may include the dummy portion 1625 connecting the first inner coupling portion 6211 and the second inner coupling portion 6212 to each other. The inner frame 1620 may include the dummy portion 1625 connecting the second inner coupling portion 6212 and the third inner coupling portion 6212 to each other. The dummy portion 1625 may connect the first inner coupling portion 6211 and the second inner coupling portion 6212 to each other. The dummy portion 1625 may connect the second inner coupling portion 6212 and the third inner coupling portion 6212 to each other. Here, the dummy portion 1625, which connects the first inner coupling portion 6211 and the second inner coupling portion 6212 to each other, may be referred to as a "first dummy portion", and the dummy portion 1625, which connects the second inner coupling portion 6212 and the third inner coupling portion 6212 to each other, may be referred to as a "second dummy portion". The dummy portion 1625 may have elasticity. In this case, the dummy portion 1625 may be referred to as a "dummy spring".

In the embodiment, the inner frame 1620 may be formed in a structure that is divided into a total of two parts by a dummy spring.

In the embodiment, by coupling the first to third inner coupling portions 6211, 6212 and 6213 through the dummy portion 1625, the capability of handling of the upper support member 1600 may be improved and deformation thereof may be inhibited. In addition, the flatness of assembly of the bobbin 1210 may be improved to thus inhibit a tilt defect and a defective stroke during autofocus driving.

In this embodiment, by connecting two driving springs (the first and second connection portions 1631 and 1632) to each other using the dummy spring and positioning fixed fusion welding points at a remote distance on the dummy spring, the durability of the spring may be improved and the occurrence of tilting may be inhibited.

The frame connection portion 1630 may include the first to fourth connection portions 1631, 1632, 1633 and 1634, which are spaced apart from each other.

The first connection portion 1631 may directly interconnect the first outer coupling portion 6111 of the first outer portion 1611 and the second inner coupling portion 6212, and the second connection portion 1632 may directly interconnect the second outer coupling portion 6112 of the second outer coupling portion 6112 and the third inner coupling portion 6213.

The third connection portion 1633 may directly interconnect the outer coupling portion of the third outer portion 1613 and the inner coupling portion of the inner frame corresponding thereto, and the fourth connection portion 1634 may directly interconnect the outer coupling portion of the fourth outer portion 1614 and the inner coupling portion of the inner frame corresponding thereto. The third connection portion 1633 and the fourth connection portion 1634 may include the third outer portion 1613 and the second inner portion 1622.

The lower elastic member 1700 may be coupled to the lower portion of the bobbin 1210 and the lower portion of the housing 1310. The lower elastic member 1700 may include the outer frame 1710, the inner frame 1720, and a frame connection portion 1730. The lower elastic member 1700 may include the outer frame 1710 coupled to the housing 1310, the inner frame 1720 coupled to the bobbin 1210, and the frame connection portion 1730 elastically interconnecting the outer frame 1710 and the inner frame 1720. For example, the inner frame 1720 may be referred to as an "inner frame", the outer frame 1710 may be referred to as an "outer frame", and the frame connection portion 1730 may be referred to as a "frame connection portion".

The lower elastic member 1700 may be integrally formed as an example. However, the disclosure is not limited thereto. In a modification, the lower elastic member 1700 may be divided into a pair members and may be used to supply a voltage to the AF coil unit 1220, for example.

The lateral support member 1800 may be coupled to the upper support member 1600 and the substrate 1410. The lateral support member 1800 may be in electrical conduction with the upper support member 1600 and the substrate 1410. The lateral support member 1800 may elastically support the housing 1310 with respect to the base 1500. The lateral support member 1800 may be coupled at one side thereof to the stator 1400 and/or the base 1500 and at the other side thereof to the upper support member 1600 and/or the housing 1310. The lateral support member 1800 may be coupled to the stator 1400 and the upper support member 1600. The lateral support member 1800 may be coupled at one side thereof to the stator 1400 and at the other side thereof to the upper support member 1600. With this structure, the lateral support member 1800 may elastically support the second mover 1300 with respect to the stator 1400 so that the second mover 1300 may be moved or tilted in the horizontal direction. The lateral support member 1800 may include a plurality of wires as an example. Alternatively, the lateral support member 1800 may include a plurality of leaf springs as a modification. On the other hand, the lateral support member 1800 may be integrally formed with the upper elastic member 1600.

The lateral support member 1800 may include first to fourth support portions 1810, 1820, 1830 and 1840. The lateral support member 1800 may include the first support portion 1810 coupled to the first outer portion 1611. The lateral support member 1800 may include the second support portion 1820 coupled to the second outer portion 1612. The lateral support member 1800 may include the third support portion 1830 coupled to the third outer portion 1613. The lateral support member 1800 may include the fourth support portion 1840 coupled to the fourth outer portion 1614. The first to fourth support portions 1810, 1820, 1830 and 1840 may be spaced apart from each other.

The lateral support member 1800 or the upper elastic member 1600 may include a shock absorbing portion (not illustrated) for absorbing shocks. The shock absorbing portion may be provided on at least one of the lateral support member 1800 and the upper elastic member 1600. The shock absorbing portion may be a separate member such as a damper. Alternatively, the shock absorbing portion may be realized by changing the shape of a portion of any one of the lateral support member 1800 and the upper elastic member 1600.

The sensor unit may be provided for at least one of autofocus feedback and hand-tremor compensation feedback. The sensor unit may sense the position or movement of any one of the first mover 1200 and the second mover 1300.

The sensor unit may include an AF sensor unit and an OIS sensor unit 1920 as an example. The AF sensor unit may sense vertical movement of the bobbin 1210 relative to the housing 1310 to provide information for AF feedback. The OIS sensor unit 1920 may provide information for OIS feedback by sensing the horizontal movement or tilting of the second mover 1300.

The AF sensor unit may include the sensing coil unit 1910, a high-frequency current application unit (not illustrated), and a voltage sensing unit (not illustrated).

The sensing coil unit 1910 may be located on the housing 1310. The sensing coil unit 1910 may be located around the upper portion of the housing 1310. The sensing coil unit 1910 may be located along the upper end of the housing 1310. The sensing coil unit 1910 may be, for example, in the form of a closed curve, without limitation thereto. The sensing coil unit 1910 may be spaced apart from the AF coil unit 1220. With this structure, when a voltage is applied to the AF coil unit 1220, an inductive voltage may be generated in the sensing coil unit 1910. The voltage may be induced in the sensing coil unit 1910 according to the distance between the sensing coil unit 1910 and the AF coil unit 1220. That is, the voltage induced in the sensing coil unit 1910 may vary according to the distance between the sensing coil unit 1910 and the AF coil unit 1220. In the present embodiment, the movement and/or the position of the bobbin 1210 may be detected by measuring the voltage induced in the sensing coil unit 1910 using the characteristic described above. The movement and/or the position of the bobbin 1210 detected in this way may be used for an autofocus feedback function.

The sensing coil unit 1910 may be in electrical conduction with the second outer portion 1612 and the fourth outer portion 1614. In this case, the sensing coil unit 1910 and the substrate 1410 may be in electrical conduction with each other through the second support portion 1820 coupled to the second outer portion 1612 and the fourth support portion 1840 coupled to the fourth outer portion 1614. With this structure, the inductive voltage, which is induced in the sensing coil unit 1910 by high-frequency current supplied to the AF coil unit 1220, may be measured. In addition, the induced current, induced in the sensing coil unit 1910 by the high-frequency current supplied to the AF coil unit 1220, may be transferred to the terminal portion 1412 of the substrate 1410 through the second outer portion 1612 and the second support portion 1820. Alternatively, the induction current induced in the sensing coil unit 1910 by the high-frequency current supplied to the AF coil unit 1220 may be transferred to the terminal portion 1412 of the substrate 1410 through the fourth outer portion 1614 and the fourth support portion 1840.

A lead wire 1911 of the sensing coil unit 1910 may be coupled to the outer frame 1610 using the solder element 1912, as illustrated in FIG. 18. However, the coupling between the sensing coil unit 1910 and the outer frame 1610 is not limited to soldering, and any type of coupling for fixing both of them may be applied.

A high-frequency current applying unit may apply high-frequency current to the AF coil unit 1220. That is, the high-frequency current applying unit may apply high-frequency current such as an impulse current to the AF coil unit 1220. Here, the high-frequency current applied to the AF coil unit 1220 may induce a voltage in the sensing coil unit 1910 without affecting the movement of the bobbin 1210. That is, the high-frequency current applying unit may generate the inductive voltage in the sensing coil unit 1910 without affecting the autofocus driving of the bobbin 1210 by applying high-frequency current to the AF coil unit 1220. The high-frequency current applying unit may supply high-frequency current to the AF coil unit 1220 according to a predetermined time interval.

A voltage sensing unit may sense the voltage induced in the sensing coil unit 1910. That is, the voltage sensing unit may sense the voltage induced in the sensing coil unit 1910, and the sensed value may be sent to a controller so that the controller may determine the position of the bobbin 1210.

Hereinafter, the operation of the camera module according to the present embodiment will be described.

First, the autofocus function of the camera module according to the present embodiment will be described. The AF coil unit 1220 is moved relative to the drive magnet unit 1320 by electromagnetic interaction between the AF coil unit 1220 and the drive magnet unit 1320 when a voltage is supplied to the AF coil unit 1220. Here, the bobbin 1210 coupled to the AF coil unit 1220 moves integrally with the AF coil unit 1220. That is, the bobbin 1210 having the lens module coupled therein moves up and down with respect to the housing 1310. This movement of the bobbin 1210 causes the lens module to be moved closer to the image sensor or to be moved away from the image sensor, whereby focus adjustment for a subject is performed.

On the other hand, autofocus feedback may be applied for more precise realization of the autofocus function of the camera module according to the present embodiment. A voltage is induced in the sensing coil unit 1910 mounted on the housing 1310 by the high-frequency current applied to the AF coil unit 1220. On the other hand, when the bobbin 1210 moves relative to the housing 1310 by drive current applied to the AF coil unit 1220, the value of the voltage induced in the sensing coil unit 1910 may change. Here, the supply of the high-frequency current to the AF coil unit 1220 may be performed at a predetermined time interval. On the other hand, the voltage sensing unit senses the value of the voltage induced in the sensing coil unit 1910 and transmits the value to the controller. The controller determines whether or not to perform an additional movement of the bobbin 1210 based on the received voltage value. Since such a process is performed in real time, the autofocus function of the camera module according to the present embodiment may be performed more precisely through autofocus feedback.

The hand-tremor compensation function of the camera module according to the present embodiment will be described. When a voltage is supplied to the OIS coil unit 1420, the drive magnet unit 1320 moves relative to the OIS coil unit 1420 by electromagnetic interaction between the OIS coil unit 1420 and the drive magnet unit 1320. Here, the housing 1310 coupled to the drive magnet unit 1320 moves integrally with the drive magnet unit 1320. That is, the housing 1310 moves in the horizontal direction relative to the base 1500. Meanwhile, the tilting of the housing 1310 relative to the base 1500 may be induced. This movement of the housing 1310 results in movement of the lens module relative to the image sensor in a direction parallel to the direction in which the image sensor is placed (the direction orthogonal to the optical axis of the lens module), so that the hand-tremor compensation function is performed.

On the other hand, hand-tremor compensation feedback may be applied for more accurate realization of the hand-tremor compensation function of the camera module according to the present embodiment. The OIS sensor 1920 mounted on the base 1500 senses the magnetic field of the drive magnet unit 1320 fixed to the housing 1310. On the other hand, when the housing 1310 moves relative to the base 1500, the amount of the magnetic field sensed by the OIS sensor 1920 changes. Meanwhile, the pair of OIS sensors 1920 senses the amount of movement or the position in the horizontal direction (the x-axis and y-axis directions) of the housing 1310 in the manner mentioned above, and transmits the sensed value to the controller. The controller determines whether or not to perform additional movement of the housing 1310 through the received sensing value. Since the above-described process is performed in real time, the hand-tremor compensation function of the camera module according to the present embodiment may be performed more precisely through hand-tremor compensation feedback.

Figure 21:
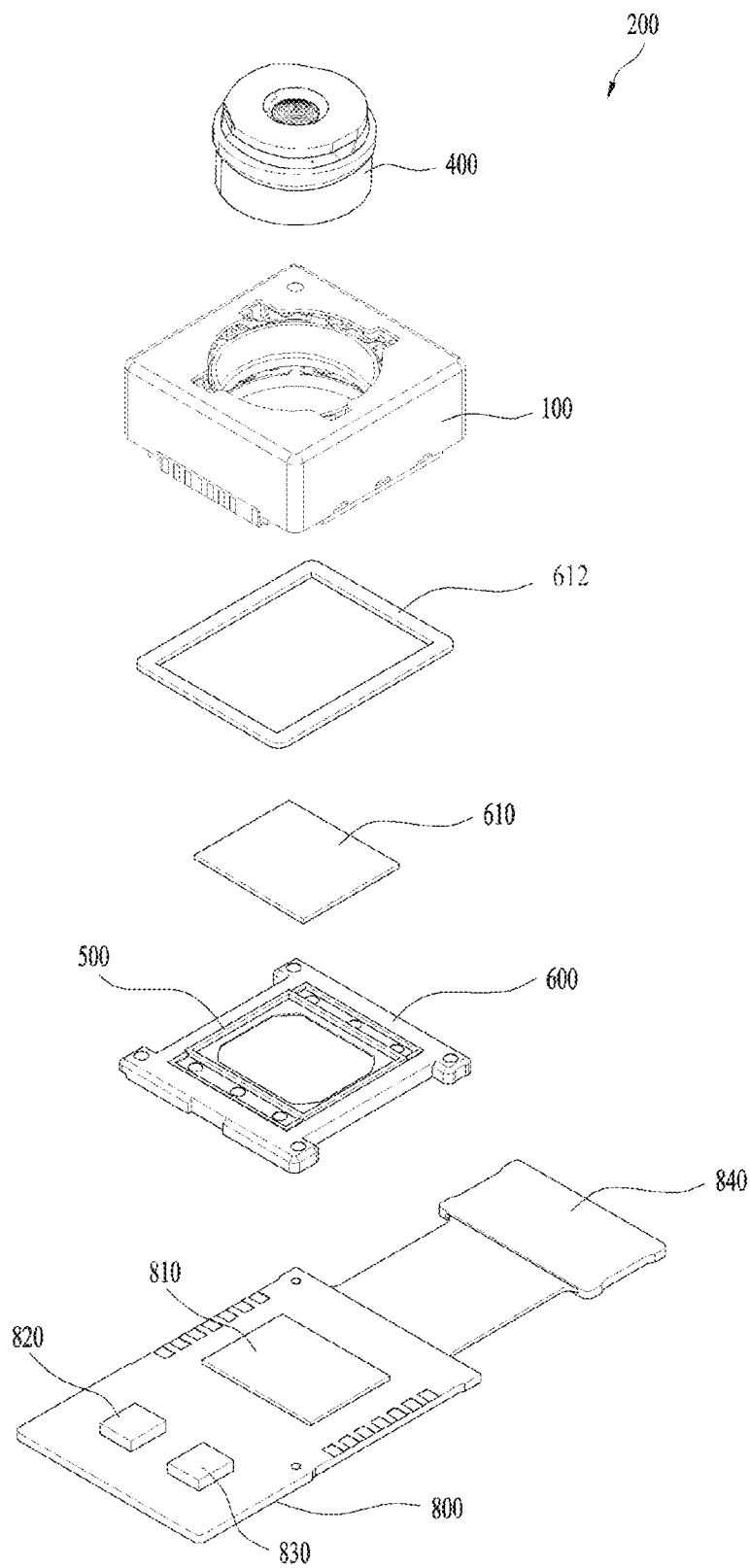
FIG. 21 illustrates an exploded perspective view of a camera module according to an embodiment.

FIG. 21 is an exploded perspective view of a camera module 200 according to an embodiment.

Referring to FIG. 21, the camera module includes a lens barrel 400, a lens driving device 100, an adhesive member 710, a filter 610, a first holder 600, a second holder 800, an image sensor 810, a motion sensor 820, a controller 830, and a connector 840. The lens driving device 100 illustrated in FIG. 21 may be the lens driving device illustrated in FIG. 14.

The lens barrel 400 may be mounted in the bobbin 110 of the lens driving device according to the embodiment.

The first holder 600 may be disposed under the base 210 of the lens driving device according to the embodiment. The filter 610 may be mounted on the first holder 600, and the first holder 600 may include a protrusion 500 on which the filter 610 is seated.

The adhesive member 710 may couple or attach the base 210 or 1500 of the lens driving device to the first holder 600. The adhesive member 710 may also serve to inhibit a foreign substance from being introduced into the lens driving device in addition to the adhesive role described above.

For example, the adhesive member 710 may be an epoxy, a thermosetting adhesive, an ultraviolet curable adhesive, or the like.

The filter 610 may serve to block the light within a specific frequency band of the light that passes through the lens barrel 400 from being incident on the image sensor 810. The filter 610 may be an infrared-light blocking filter, without limitation thereto. Here, the filter 610 may be disposed parallel to the x-y plane.

A hollow region may be formed in a portion of the first holder 600 on which the filter 610 is mounted so that the light, which has passed through the filter 610, may be incident on the image sensor 810.

The second holder 800 may be disposed under the first holder 600, and the image sensor 810 may be mounted on the second holder 600. The image sensor 810 is an element on which the light, which has passed through the filter 610, is incident so that an image including the light 15 formed.

The second holder 800 may include, for example, various circuits, elements, and a controller for converting the image formed on the image sensor 810 into an electric signal and transmitting the electric signal to an external device.

The second holder 800 may be implemented as a circuit board on which the image sensor may be mounted and a circuit pattern may be formed and to which various elements are coupled.

The image sensor 810 may receive the image included in the light incident through the lens driving device according to the embodiment, and may convert the received image into an electric signal.

The filter 610 and the image sensor 810 may be spaced apart from each other so as to face each other in the first direction.

The motion sensor 820 may be mounted on the second holder 800, and may be electrically connected to the controller 830 through the circuit pattern provided on the second holder 800.

The motion sensor 820 outputs rotational angular velocity information based on the motion of the camera module 200. The motion sensor 820 may be implemented as a two-axis or three-axis gyro sensor, or an angular velocity sensor.

The controller 820 may be mounted on the second holder 800, and may be electrically connected to the second position sensor 240 or the OIS sensor unit 1920 and the second coil 230 or the OIS coil unit 1420 of the lens driving device. For example, the second holder 800 may be electrically connected to the circuit board 250 or 1410 of the lens driving device, and the controller 820 mounted on the second holder 800 may be electrically connected to the second position sensor 240 or the OIS sensor unit 1920 and the second coil 230 or the OIS coil unit 1420 through the circuit board 250 or 1410.

The controller 830 may output a driving signal capable of performing hand-tremor compensation to the OIS movable unit of the lens driving device based on output signals provided from the second position sensor 240 or the OIS sensor unit 1920 of the lens driving device.

The connector 840 may be electrically connected to the second holder 800, and may include a port for electrical connection to the external device.

In addition, the lens driving device 100 according to the embodiment may include an optical instrument for the purpose of forming an image of an object in a space using reflection, refraction, absorption, interference, or diffraction, which are characteristics of light to increase visibility, for the purpose of recording and reproduction of an image by a lens, or for the purpose of optical measurement or image propagation or transmission, or the like. For example, the optical instrument according to the embodiment may be applied to a mobile phone, a cellular phone, a smart phone, a portable smart device, a digital camera, a laptop computer, a digital broadcasting terminal, a personal digital assistant (PDA), a navigation system, or the like, but is not limited thereto, and any device for capturing images or photographs is possible.

Figure 22:
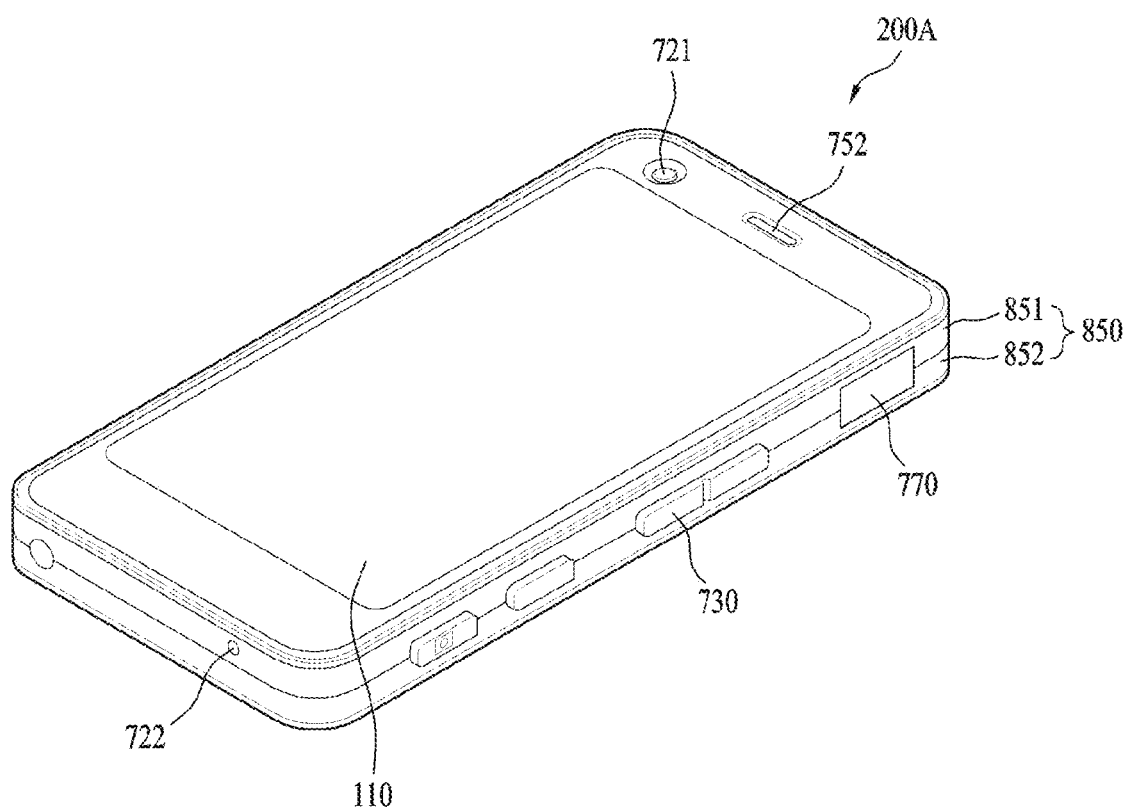
FIG. 22 illustrates a perspective view of a portable terminal according to an embodiment.
Figure 23:
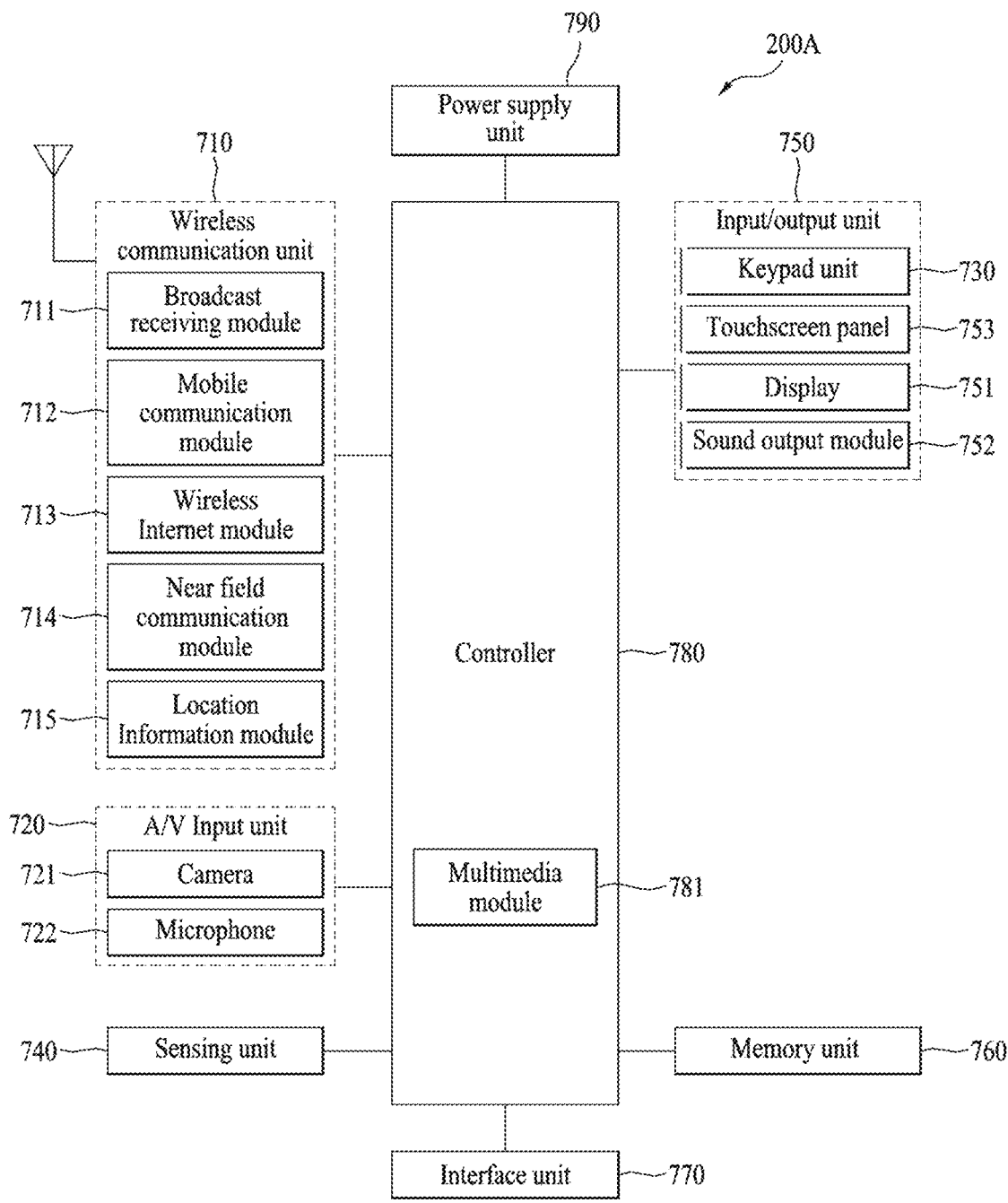
FIG. 23 illustrates the configuration of the portable terminal illustrated in FIG. 22.

FIG. 22 illustrates a perspective view of a portable terminal 200A according to an embodiment, and FIG. 23 illustrates a configuration of the portable terminal illustrated in FIG. 22.

Referring to FIGS. 22 and 23, the portable terminal 200A (hereinafter referred to as a "terminal") may include a body 850, a wireless communication unit 710, an A/V input unit 720, a sensing unit 740, an input/output unit 750, a memory unit 760, an interface unit 770, a controller 780, and a power supply unit 790.

The body 850 illustrated in FIG. 22 has a bar shape, without limitation thereto. The body 850 may be any of various types such as a slide type, a folder type, a swing type, or a swivel type in which two or more sub-bodies are coupled so as to be movable relative to each other.

The body 850 may include a case (e.g., a casing, a housing or a cover), which forms the external appearance of the body. For example, the body 850 may be divided into a front case 851 and a rear case 852. Various electronic components of the terminal may be embedded in the space formed between the front case 851 and the rear case 852.

The wireless communication unit 710 may include one or more modules that enable wireless communication between the terminal 200A and a wireless communication system or between the terminal 200A and the network in which the terminal 200A is located. For example, the wireless communication unit 710 may include a broadcast receiving module 711, a mobile communication module 712, a wireless Internet module 713, a near field communication module 714, and a location information module 715.

The audio/video (A/V) input unit 720 may serve to input an audio signal or a video signal, and may include a camera 721 and a microphone 722, for example.

The camera 721 may be the camera 200 illustrated in FIG. 21 including the lens driving device according to the embodiment.

The sensing unit 740 may sense the current state of the terminal 200A such as the opened/closed state of the terminal 200A, the position of the terminal 200A, the presence or absence of a user touch, the orientation of the terminal 200A, or the acceleration/deceleration of the terminal 200A, and may generate a sensing signal for controlling the operation of the terminal 200A. For example, when the terminal 200A takes the form of a slide phone, the sensing unit may sense whether the slide phone is opened or closed. In addition, the sensing unit functions to sense whether or not the power supply unit 790 supplies a voltage or whether or not the interface unit 770 is connected to an external device, for example.

The input/output unit 750 serves to generate an input or an output related to visual, auditory, tactile, or the like. The input/output unit 750 may generate input data for controlling the operation of the terminal 200A and may also display information processed by the terminal 200A.

The input/output unit 750 may include a keypad unit 730, a display module 751, a sound output module 752, and a touchscreen panel 753. The keypad unit 730 may generate input data based on input to a keypad.

The display module 751 may include a plurality of pixels, the color of which changes according to an electric signal. For example, the display module 751 may include at least one of a liquid crystal display, a thin film transistor-liquid crystal display, an organic light-emitting diode, a flexible display, or a 3-dimensional (3D) display.

The sound output module 752 may output audio data received from the wireless communication unit 710 in a call signal reception mode, a call mode, a recording mode, a voice recognition mode, a broadcast reception mode, or the like, or may output audio data stored in the memory unit 760.

The touch screen panel 753 may convert a change in capacitance caused by a user touch on a specific area of the touchscreen into an electric input signal.

The memory unit 760 may store a program for processing and controlling the controller 780 and may temporarily store input/output data (e.g., a telephone directory, a message, audio, a still image, a photograph, or a moving image). For example, the memory unit 760 may store an image photographed by the camera 721, for example, a photograph or a moving image.

The interface unit 770 serves as a path for connection to an external device connected to the terminal 200A. The interface unit 770 receives data from an external device, receives a voltage to transmit the voltage to each element in the terminal 200A, or allows data in the terminal 200A to be transmitted to an external device. For example, the interface unit 770 may include a wired/wireless headset port, an external charger port, a wired/wireless data port, a memory card port, a port for connecting a device equipped with an identification module, an audio input/output (I/O port, a video input/output (I/O) port, and an earphone port.

The controller 780 may control the overall operation of the terminal 200A. For example, the controller 780 may perform a related control operation and process for a voice call, data communication, a video call, and the like.

The controller 780 may include a multimedia module 781 for multimedia playback. The multimedia module 781 may be implemented in the controller 180, or may be implemented separately from the controller 780.

The controller 780 may perform a pattern recognition process for recognizing a handwriting input or drawing input performed on the touchscreen as characters and images, respectively.

The power supply unit 790 may supply external power or internal power according to the control of the controller 780 and may supply a voltage required for the operation of the respective elements.

The above described features, configurations, effects, and the like are included in at least one of the embodiments of the present invention, and should not be limited to only one embodiment. In addition, the features, configurations, effects, and the like as illustrated in each embodiment may be implemented with regard to other embodiments as they are combined with one another or modified by those skilled in the art. Thus, content related to these combinations and modifications should be construed as including in the scope and spirit of the invention as disclosed in the accompanying claims.

INDUSTRIAL APPLICABILITY

Embodiments may be used in a lens driving device, which is capable of securing a sufficient distance between a sensing coil and a first coil and overcoming a spatial limitation pertaining to installation of an upper elastic member in a housing, and a camera module and an optical apparatus including the same.

The invention claimed is:

1. A lens driving device comprising:
   a housing;
   a bobbin disposed in the housing;
   a first coil disposed on the bobbin;
   a magnet disposed on the housing; and
   an upper elastic member coupled to the bobbin and the housing;
   a circuit board disposed below the housing; and
   a support member electrically connecting the upper elastic member and the circuit board;
   wherein the upper elastic member comprises an inner frame coupled to the bobbin, an outer frame coupled to the housing, and a frame connection portion connecting the inner frame and the outer frame,
   wherein the outer frame comprises first to fourth outer portions spaced apart from one another, and
   wherein the first and third outer portions connect to the inner frame through the frame connection portion, and the second and fourth outer portions are spaced apart from the inner frame and the frame connection portion.

2. The lens driving device according to claim 1, comprising:
   a second coil disposed on the circuit board; and
   a base disposed below the circuit board.

3. The lens driving device according to claim 1, wherein the outer frame comprises a first coupling portion coupled to the housing, a second coupling portion coupled to one end of the support member, and a connection portion connecting the first coupling portion and the second coupling portion, and
   wherein the one end of the support member is bonded to the second coupling portion by a solder.

4. The lens driving device according to claim 1, wherein the outer frame comprises a first coupling portion coupled to the housing, a second coupling portion coupled to one end of the support member, and a connection portion connecting the first coupling portion and the second coupling portion, and wherein the second coupling portion comprises a through-hole through which the one end of the support member passes.

5. The lens driving device according to claim 2, wherein the second coil comprises a substrate disposed on the circuit board and coils formed in the substrate.

6. The lens driving device according to claim 1, wherein the support member is disposed at a corner of the housing.

7. The lens driving device according to claim 1, wherein the bobbin is configured to be moved by interactions between the magnet and the first coil.

8. The lens driving device according to claim 1, comprising a sensing coil disposed on the housing and configured to generate an inductive voltage by interactions with the first coil.

9. The lens driving device according to claim 8, wherein the sensing coil is wound on an outer surface of the housing.

10. The lens driving device according to claim 1, wherein the frame connection portion comprises first to fourth frame connection portions spaced apart from one another,
    wherein the inner frame comprises a first inner portion and a second inner portion that are spaced apart from each other,
    wherein the first outer portion is connected to the first inner portion through the first frame connection portion and the second frame connection portion, and
    wherein the third outer portion is connected to the second inner portion through the third frame connection portion and the fourth frame connection portion.

11. The lens driving device according to claim 1, comprising a sensing coil disposed on the housing and configured to generate an inductive voltage by interactions with the first coil, and
    wherein two of the first to fourth outer portions are electrically connected to the second coil and the other two of the first to fourth outer portions are electrically connected to the first coil.

12. The lens driving device according to claim 1, wherein the support member comprises a first support member coupled to the first outer portion, a second support member coupled to the second outer portion, a third support member coupled to the third outer portion, and a fourth support member coupled to the fourth outer portion.

13. The lens driving device according to claim 12, wherein the first to fourth support members are spaced apart from one another.

14. The lens driving device according to claim 1, wherein the housing comprises a first side surface portion and a second side surface portion adjacent to the first side surface portion,
    wherein the bobbin comprises a first side portion facing the first side surface portion of the housing and a second side portion facing the second side surface portion of the housing,
    wherein the first outer portion comprises a first outer coupling portion coupled to the first side surface portion of the housing and a second outer coupling portion coupled to the second side surface portion of the housing, wherein the inner frame comprises a first inner coupling portion coupled to the first side portion of the bobbin and a second inner coupling portion coupled to the second side portion of the bobbin, and wherein the frame connection portion comprises a first frame connection portion directly interconnecting the first outer coupling portion and the second inner coupling portion.

15. The lens driving device according to claim 14, wherein the housing comprises a third side surface portion adjacent to the second side surface portion and the bobbin comprises a third side portion facing the third side surface portion, wherein the first outer portion comprises a third outer coupling portion coupled to the third side surface portion of the housing, wherein the inner frame comprises a third inner coupling portion coupled to the third side portion of the bobbin, and the frame connection portion comprises a second frame connection portion directly interconnecting the second outer coupling portion and the third inner coupling portion.

16. The lens driving device according to claim 14, wherein the inner frame comprises a dummy portion interconnecting the first inner coupling portion and the second inner coupling portion.

17. A camera module comprises:
a lens;
the lens driving device according to claim 1 and coupled to the lens; and
an image sensor.

18. The lens driving device according to claim 1, wherein the first and third outer portions are opposite to each other, and the second and fourth outer portions are opposite to each other.

19. A lens driving device comprising:
a housing;
a bobbin disposed in the housing;
a first coil disposed on the bobbin;
a magnet disposed on the housing; and
an upper elastic member coupled to the bobbin and the housing,
a circuit board disposed below the housing; and
a support member electrically connecting the upper elastic member and the circuit board,
wherein the upper elastic member comprises an inner frame coupled to the bobbin, an outer frame coupled to the housing, and a frame connection portion connecting the inner frame and the outer frame, wherein the outer frame comprises first to fourth outer portions spaced apart from one another and the frame connection portion comprises first to fourth frame connection portions spaced apart from one another, wherein the inner frame comprises first and second inner portions spaced apart from each other, wherein the first outer portion is connected to the first inner portion through the first connection portion and the second connection portion, wherein the third outer portion is connected to the second inner portion through the third connection portion and the fourth connection portion, and wherein the second and fourth outer portions are spaced apart from the frame connection portion and the inner frame.

20. A lens driving device comprising:
a housing;
a bobbin disposed in the housing;
a first coil disposed on the bobbin;
a magnet disposed on the housing;
an upper elastic member coupled to the bobbin and the housing,
a circuit board disposed below the housing; and
a support member electrically connecting the upper elastic member and the circuit board,
wherein the upper elastic member comprises an inner frame coupled to the bobbin, an outer frame coupled to the housing, and a frame connection portion connecting the inner frame and the outer frame, wherein the outer frame comprises first to fourth outer portions spaced apart from one another, wherein the housing comprises a first side surface portion and a second side surface portion adjacent to the first side surface portion, wherein the bobbin comprises a first side portion facing the first side surface portion of the housing and a second side portion facing the second side surface portion of the housing, wherein the first outer portion comprises a first outer coupling portion coupled to the first side surface portion of the housing and a second outer coupling portion coupled to the second side surface portion of the housing, wherein the inner frame comprises a first inner coupling portion coupled to the first side portion of the bobbin and a second inner coupling portion coupled to the second side portion of the bobbin, and wherein the frame connection portion comprises a first frame connection portion directly interconnecting the first outer coupling portion and the second inner coupling portion.

* * * * *